(12) United States Patent
Diallo

(10) Patent No.: US 12,000,972 B2
(45) Date of Patent: Jun. 4, 2024

(54) ATTENUATION OF INTERFACE WAVES USING SINGLE COMPONENT SEISMIC DATA

(71) Applicant: Saudi Arabian Oil Company, Dhahran (SA)

(72) Inventor: Mamadou Sanou Diallo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 290 days.

(21) Appl. No.: 17/505,756

(22) Filed: Oct. 20, 2021

(65) Prior Publication Data

US 2023/0123550 A1  Apr. 20, 2023

(51) Int. Cl.
*G01V 1/36* (2006.01)
(52) U.S. Cl.
CPC ................................. *G01V 1/364* (2013.01)
(58) Field of Classification Search
None
See application file for complete search history.

(56) References Cited

U.S. PATENT DOCUMENTS

| | | | |
|---|---|---|---|
| 4,757,480 A | 7/1988 | Gutowski | |
| 5,781,502 A | 7/1998 | Becquey | |
| 6,021,379 A | 2/2000 | Duren et al. | |
| 6,519,205 B1 | 2/2003 | Baeten et al. | |
| 7,181,347 B2 | 2/2007 | Moore | |
| 7,239,578 B2 | 7/2007 | Robinson | |
| 7,539,578 B2 | 5/2009 | Saenger | |
| 7,554,883 B2 | 6/2009 | Barnes | |
| 7,584,057 B2 | 9/2009 | Ozbek | |

(Continued)

FOREIGN PATENT DOCUMENTS

| CA | 2847133 A1 | 9/2014 |
|---|---|---|
| CN | 101915939 A | 12/2010 |

(Continued)

OTHER PUBLICATIONS

Alyousuf et al. "Advances in Surface-Wave Analysis Using Single Sensor Seismic Data and Deep Neural Network Algorithm for Near Surface Characterization" Society of Petroleum Engineers, 2019, 9 pgs.

(Continued)

*Primary Examiner* — Krystine E Breier
(74) *Attorney, Agent, or Firm* — DINSMORE & SHOHL LLP

(57) ABSTRACT

Systems and methods for filtering interface waves from single component seismic data are disclosed. In one embodiment, a method of filtering seismic data includes comparing amplitude coefficients of a matrix storing the seismic data in a time-frequency domain against an amplitude threshold, and comparing frequencies of the matrix against a maximum expected frequency of noise. The method further includes, for each amplitude coefficient having less than the amplitude threshold and an associated frequency less than the maximum expected frequency of noise, scaling the amplitude coefficient to reduce its value. The method also includes performing an inverse time-frequency transformation on the matrix to generate a noise model in a time domain, and subtracting the noise model from the seismic data in the time domain to generate filtered seismic data.

18 Claims, 17 Drawing Sheets

(56) References Cited

U.S. PATENT DOCUMENTS

| | | |
|---|---|---|
| 7,590,491 B2 | 9/2009 | Saenger |
| 7,725,265 B2 | 5/2010 | Saenger |
| 8,352,192 B2 | 1/2013 | Diallo et al. |
| 8,451,684 B2 | 5/2013 | Lee et al. |
| 8,483,009 B2 | 7/2013 | Lee et al. |
| 8,553,497 B2 | 10/2013 | Krohn |
| 8,712,694 B2 | 4/2014 | Edme et al. |
| 8,838,382 B2 | 9/2014 | Drysdale |
| 8,892,410 B2 | 11/2014 | Krohn |
| 9,110,187 B2 | 8/2015 | Muyzert et al. |
| 9,304,221 B2 | 4/2016 | Edme et al. |
| 9,594,174 B2 | 3/2017 | Goujon et al. |
| 9,829,590 B2 | 11/2017 | Hardage |
| 9,891,331 B2 | 2/2018 | Hornbostel et al. |
| 10,048,395 B2 | 8/2018 | Goujon et al. |
| 10,145,974 B2 | 12/2018 | Hornbostel et al. |
| 10,295,687 B2 | 5/2019 | Bloor et al. |
| 2011/0004409 A1 | 1/2011 | Diallo et al. |
| 2012/0250460 A1 | 10/2012 | Edme et al. |
| 2014/0028843 A1 | 1/2014 | Loher et al. |
| 2014/0160887 A1 | 6/2014 | Robertsson |
| 2015/0362608 A1 | 12/2015 | van Groenestijn |
| 2016/0320506 A1 | 11/2016 | Almuhaidib |
| 2017/0248716 A1* | 8/2017 | Poole .................... G01V 1/282 |
| 2019/0094400 A1 | 3/2019 | Lu et al. |
| 2020/0292726 A1* | 9/2020 | Sun ........................ G01V 1/368 |

FOREIGN PATENT DOCUMENTS

| | | | |
|---|---|---|---|
| CN | 102338886 A | 2/2012 | |
| CN | 103954993 A | 7/2014 | |
| CN | 105652322 A | 6/2016 | |
| CN | 104199104 A | 3/2017 | |
| CN | 104820242 B | 6/2017 | |
| CN | 109239780 A | 1/2019 | |
| WO | 2008005775 A2 | 1/2008 | |
| WO | WO-2009120430 A1 * | 10/2009 | ............ G01V 1/284 |
| WO | 2016155771 A1 | 10/2016 | |
| WO | 2021133987 A1 | 7/2021 | |
| WO | 2021163571 A1 | 8/2021 | |

OTHER PUBLICATIONS

Diallo et al. "Characterization of Dispersive Rayleigh wave using Wavelet Transforms" Applied and Industrial Mathematics, University of Potsdam, Am Neuen Palais 10, 14469 Postdam, Germany, 2003, 1 pg.

Diallo et al. "Instantaneous polarization attributes in the time-frequency domain and wavefield separation" Geophysical Prospecting, 2005, 53, 723-731, 9 pgs.

Diallo et al. "Characterization of polarization attributes of seismic waves using continuous wavelet transforms" Goephysics, vol. 71, No. 3 (May-Jun. 2006); p. V67-V77, 7 Figs., 2 Tables, 11 pgs.

Diallo et al. "Scholte Wave Attenuation with Polarization Filtering using Pressure and Vertical Geophone Sensors" PTC (International Petroleum Technology Conference) 2019, 9 pgs.

Diallo et al. "Scholte Wave attenuation with Polarization Filtering Using Pressure and Vertical Geophone sensors" Saudi Aramco, 2019, 3 pgs.

Ernst et al. "Removal of scattered guided waves from seismic data" Geophysics, vol. 67, No. 4 (Jul.-Aug. 2002); p. 1240-1248, 9 Figs., 9 pgs.

Holschneider et al. "Characterization of dispersive surface waves using continuous wavelet transforms" Geophys. J. Int. (2005) 163, 463-478, 16 pgs.

Kulesh et al. "Modeling of Wave Dispersion Using Continuous Wavelet Transforms" Pure appl. geophys. 162 (2005) 843-855, 14 pgs.

Kulesh et al. "Geophysical Wavelet Library: Applications of the Continuous Wavelet Transform to the Polarization and Dispersion Analysis of Signals" Proceedings of the 2007 International Conference on Scientific Computing, 2008, 8 pgs.

Lal et al. "Signal Enhancement in OBC data—A Case Study Western Offshore Basin, India" 10th Biennial International Conference & Exposition, 2013, 6 pgs.

Mars et al. "Advanced signal processing tools for dispersive waves" Near Surface Geophysics, 2004, 199-210, 12 pgs.

VanDedem "3D surface-related multiple prediction" DocVision BV. Technische Universiteit Delft, 2002, 226 pgs.

Wang et al. "Marine guided waves: Applications and filtering using physical modeling data" Allied Geophysical Labratory, 2014, 33 pgs.

International Search Report and Written Opinion dated Mar. 31, 2021, pertaining to Int'l Application No. PCT/US2020/033632.

International Search Report and Written Opinion dated May 17, 2021, pertaining to Int'l Application No. PCT/US2021/017968.

Elboth, Thomas, et al., "Time-frequency seismic data de-noising," Geophysical Prospecting, 58.3: pp. 441-453, May 2010, 13 pages.

Saudi Arabian First Examination Report, dated Dec. 23, 2023, pp. 1-8, pertaining to corresponding Saudi Arabian Application No. 122440394, filed Oct. 20, 2022.

* cited by examiner

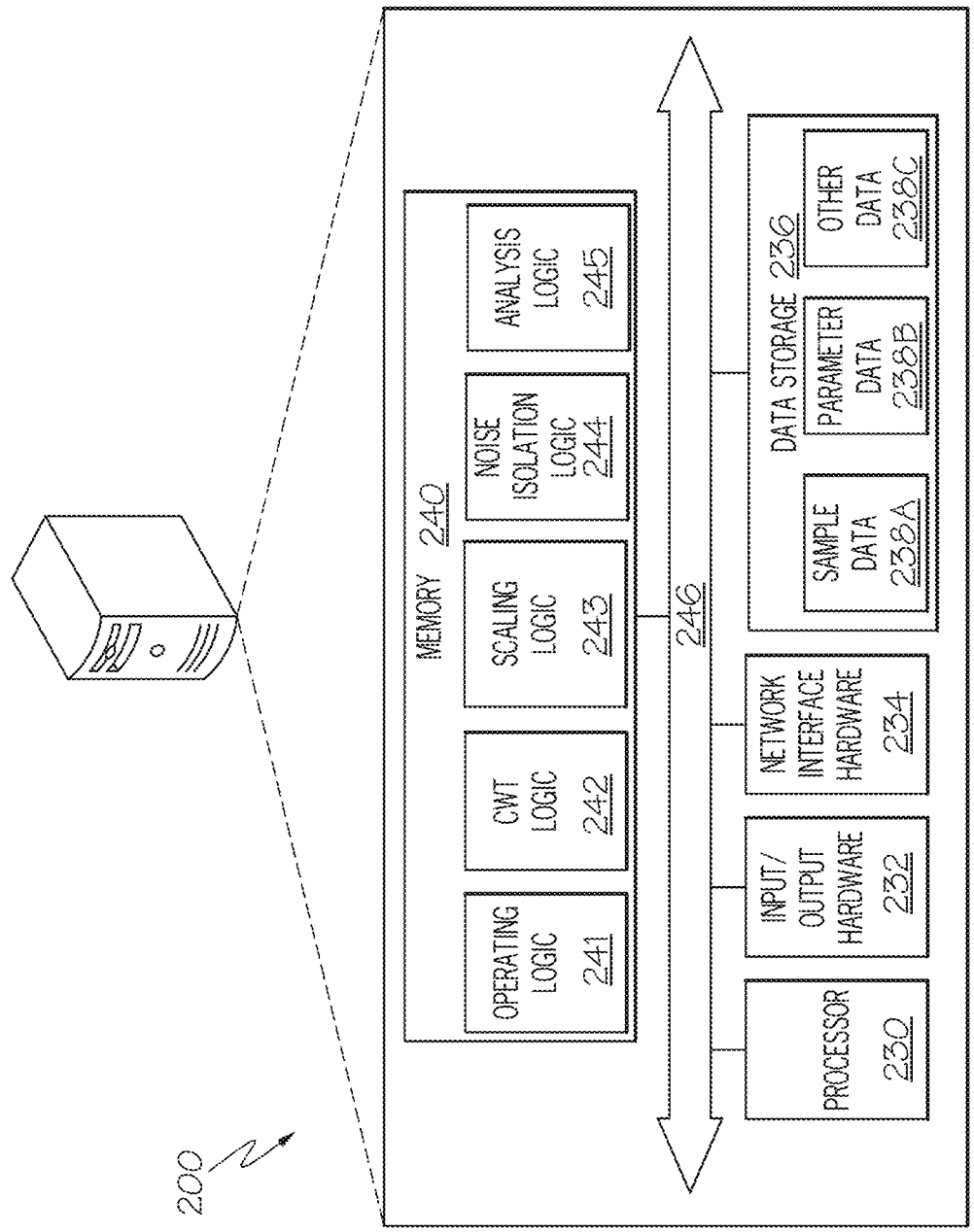

ATTENUATION OF INTERFACE WAVES USING SINGLE COMPONENT SEISMIC DATA

TECHNICAL FIELD

The present specification generally relates to analyzing seismic data and, more specifically, to attenuating interface waves from seismic data.

BACKGROUND

Rayleigh, Scholte and guided waves are types of interface waves that are generated when seismic waves propagate in bounded media. Rayleigh waves, commonly referred to as "Ground Roll" in exploration geophysics, occur at the solid/air interface; Scholte waves are generated at the interface between a fluid (water) layer and solid (elastic) layer. Generation of Rayleigh and Scholte waves requires appropriate boundary conditions at one interface only. In contrast, generation of guided waves requires appropriate boundary conditions at two interfaces. For example, in the case of an ocean bottom cable (OBC) acquisition, occurrence of strong guided waves observed are predominantly on the pressure sensor, resulting from the interference of critically reflected waves that bounce back and forth between the free surface and water bottom boundaries.

Previous methods of filtering interface waves require multiple seismic traces and multi-component data, which is undesirable because the computing costs and times are high.

Accordingly, a need exists for alternative methods for filtering or otherwise attenuating interface waves of seismic data.

SUMMARY

In one embodiment, a method of filtering seismic data includes comparing amplitude coefficients of a matrix storing the seismic data in a time-frequency domain against an amplitude threshold, and comparing frequencies of the matrix against a maximum expected frequency of noise. The method further includes, for each amplitude coefficient having less than the amplitude threshold and an associated frequency less than the maximum expected frequency of noise, scaling the amplitude coefficient to reduce its value. The method also includes performing an inverse time-frequency transformation on the matrix to generate a noise model in a time domain, and subtracting the noise model from the seismic data in the time domain to generate filtered seismic data.

In another embodiment, a method of filtering seismic data includes comparing amplitude coefficients of a matrix storing the seismic data in a time-frequency domain against an amplitude threshold, and comparing frequencies of the matrix against a minimum expected frequency of noise. The method further includes, for each amplitude coefficient having a value less than the amplitude threshold and an associated frequency greater than the minimum expected frequency of noise, scaling the amplitude coefficient to reduce a value of the amplitude coefficient. The method also includes performing an inverse time-frequency transformation on the matrix to generate a noise model in a time domain, and subtracting the noise model from the seismic data in the time domain to generate filtered seismic data.

In yet another embodiment, a method of filtering seismic data includes comparing amplitude coefficients of a matrix storing the seismic data in a time-frequency domain against an amplitude threshold, and comparing frequencies of the matrix against a maximum expected frequency of one or more of Scholte waves and Rayleigh waves. The method further includes for each amplitude coefficient having less than the amplitude threshold and an associated frequency less than the maximum expected frequency, scaling the amplitude coefficient to reduce its value to generate a first scaled matrix. The method also includes performing an inverse time-frequency transformation on the first scaled matrix to generate a first noise model in a time domain, and comparing the frequencies of the matrix against a minimum expected frequency of guided waves. The method further includes, for each amplitude coefficient having a value less than the amplitude threshold and an associated frequency greater than the minimum expected frequency, scaling the amplitude coefficient to reduce a value of the respective amplitude coefficient to generate a second scaled matrix. The method also includes performing an inverse time-frequency transformation on the second scaled matrix to generate a second noise model in the time domain, and subtracting the first noise model and the second noise model from the seismic data in the time domain to generate filtered seismic data.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 23 schematically illustrates an example computing system for filtering interface waves from seismic data.

DETAILED DESCRIPTION

Embodiments of the present disclosure are directed to systems and methods for efficiently filtering interface waves, such as Scholte/Rayleigh and guided waves, from seismic data. The embodiments described herein require only single component data, unlike previous methods; however, the methods described herein may be performed on multi-component data if desired. With multi-component data, the filtering operation is performed on each component independently, which increases computing time and power. Embodiments of the present disclosure yield better filtering over previous multi-component methods, such as polarization filter methods, particularly, in cases where the Scholte wave component that is leaking onto the pressure sensor is very weak.

Embodiments provide an effective interface wave attenuation method and an alternative to polarization filtering when multi-component data are not available. Thus, embodiments provide an effective method of interface waves (guided waves, Scholte waves, Rayleigh waves) attenuation that operates on single trace/single component that can be used in all environments, such as land, marine and transition zone. The fact that the embodiments of the present disclosure operate on a trace-by-trace operation makes it immune to the practical constraint of spatial sampling that may result in spatial aliasing of recorded interface waves which considerably reduce the effectiveness of any multichannel method.

More particularly, the filtering methods described herein operate in the time-frequency domain using a continuous wavelet transform algorithm. Embodiments differ from prior polarization filtering in that it does not require at least two seismic traces from a given receiver station to work. Thus, the methods described herein are advantageous over multi-channel filtering approaches based on frequency-wavenumber (FK) or Tau-p transforms. As described in more detail below, the filtering operation includes two options, one accounting for the Scholte/Rayleigh waves and the other accounting for guided waves. The two options account for the fact that the generation of guided waves on the one hand and Scholte/Rayleigh waves on the other differ in the number of interfaces where boundary conditions are enforced.

Various embodiments of systems and methods for attenuating interface waves on seismic data are described in detail below.

Figure 1:
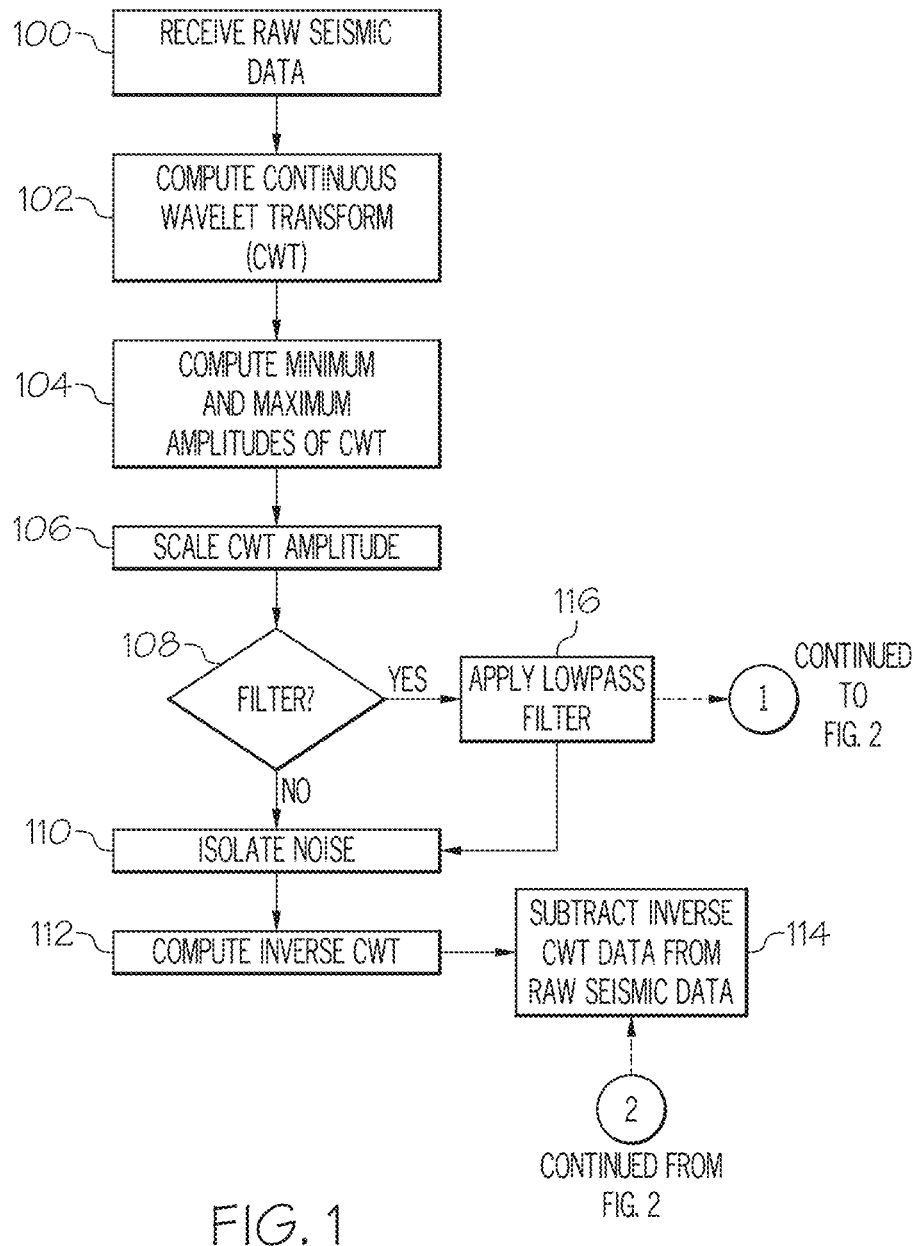
FIG. 1 depicts a flowchart illustrating an example method of filtering interface waves from seismic data according to one or more embodiments described and illustrated herein.

FIG. 1 graphically depicts an example method for filtering noise from seismic data. The noise may be in the form of guided waves, Scholte waves, or Rayleigh waves. At block 100, raw seismic data is received by any means. The raw seismic data may be received by a computing system operable to perform the noise filtering, for example. Embodiments are not limited by the method in which the seismic data is generated. For example, single component (alternatively, multi-component) seismic sensors are disposed within a geographical area. Non-limiting examples of seismic sensors include geophones, hydrophones and accelerometers. One or more seismic generators, such as seismic trucks or explosives (air-guns in marine case), generate seismic vibrations in the Earth that are detected by the seismic sensors in the form of raw seismic data.

After receipt of the raw seismic data that is to be processed, each seismic trace of the raw seismic data is transformed into the time-frequency domain at block 102. As an example, the seismic trace is transformed into the time-frequency domain by a continuous wavelet transform that generates a continuous wavelet transform CWT (i, j) (also referred to herein as a matrix CWT (i, j)) of the seismic trace, where i is the index of frequency and j is the index of time of the sample (i.e., the seismic trace). The coefficients of the matrix CWT is the amplitude at the particular frequency (index i) and particular time (index j).

Next, at block 104, the minimum amplitude MinAmp and the maximum amplitude MaxAmp of the amplitude coefficients of the absolute value of the continuous wavelet transform |CWT (i, j)| are determined to scale the continuous wavelet transform CWT (i, j) at block 106. The amplitude coefficients of the continuous wavelet transform CWT (i, j) are scaled using the computed minimum and maximum amplitudes, as shown by Equation 1 below, and which yields an intermediate amplitude matrix temp (i, j) with values between 0 and 1.

$$\text{temp}(i, j) = \frac{(\text{MaxAmp} - |CWT(i, j)|)}{(\text{MaxAmp} - \text{MinAmp})} \quad \text{Eq. 1}$$

Figure 12A:
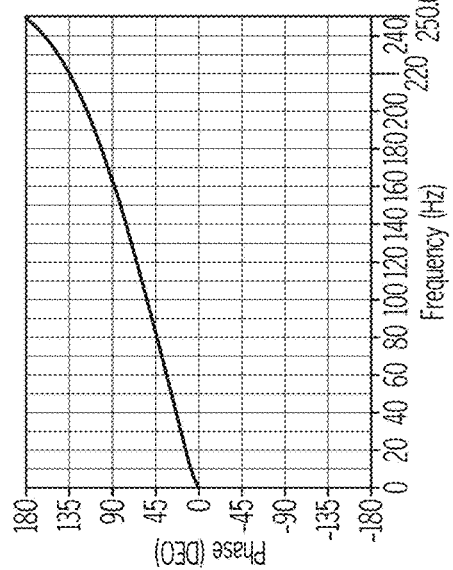
FIGS. 12A and 12B graphically illustrate the frequency spectra of the seismic data of FIG. 11A according to one or more embodiments described and illustrated herein.

It is generally the case that Scholte/Rayleigh wave arrivals dominate the amplitude, and thus values close to 1 in the intermediate amplitude matrix temp (i, j) are most likely to be associated with Scholte/Rayleigh wave arrivals. In situations where Scholte/Rayleigh wave arrivals do not dominate the amplitude, further processing may be needed. At block 108 it is determined whether or not the intermediate amplitude matrix temp (i, j) should be filtered. When Scholte/Rayleigh wave arrivals dominate the amplitude, no filtering is performed and the process moves to block 110. To determine whether or not the Scholte/Rayleigh wave dominates, the amplitude of the spectra is analyzed at a low frequency. When the amplitude of the spectra is above a threshold in a low frequency range (e.g., 0 to 20 Hz), the Scholte/Rayleigh wave dominates. Referring to FIG. 12A as an example, an amplitude peak around 0-15 Hz indicates that the Scholte/Rayleigh wave dominates the amplitude. However, when the Scholte/Rayleigh wave arrivals do not dominate the amplitude, the process moves to block 116 where a low-pass filter is applied to the intermediate amplitude matrix temp (i, j).

At block 116 the intermediate amplitude matrix temp (i, j) is low-pass filtered to a frequency where the Scholte/Rayleigh waves will represent the strongest amplitude (e.g., 0-20 Hz). Next, the Scholte/Rayleigh wave arrivals are estimated based on the filtered data of the intermediate amplitude matrix temp (i, j). In other words, when the time-frequency separation between the Scholte/Rayleigh wave and the signal is not sufficient to separate them without harming the reflection signal, the amplitude is used to distinguish them apart. This step relies on the assumption that the Scholte/Rayleigh waves are strong amplitude arrival relative to the reflection signal. The estimated Scholte/Rayleigh wave noise is then subtracted from the original data of the intermediate amplitude matrix temp (i, j).

Referring once again to block 106, in the case of guided waves rather than Scholte/Rayleigh waves, an additional scaling operation may be provided following the operation of Equation 1. The additional scaling operation is used to squash the intermediate amplitude matrix temp (i, j) using a sigmoid-like function. This function acts similar to a binary data classifier (i.e., IS a guided wave versus IS NOT a guided wave) by pushing the smaller of temp (i, j) further towards 0.5 and the larger values towards 1. After computing the intermediate amplitude matrix temp (i, j) using Equation 1, a new scaling may be computed by the sigmoid function of Equation 2:

$$\text{temp}(i,j)=1/[1(e^{(-temp(i,j))})^a)] \quad \text{Eq. 2}$$

where a is an integer that dictates the rate of decay of amplitude (between a maximum of 1 and a minimum of 0.5) of the sigmoid-like curve. The optimal value for a may be determined experimentally. As a non-limiting example, the value for a may be between 3 and 8.

At block 110, noise is isolated from the intermediate amplitude matrix temp (i, j). Noise in the form of Scholte/Rayleigh waves is isolated from either the intermediate amplitude matrix temp (i, j) using Equation 1 directly from block 106 or a filtered intermediate amplitude matrix temp (i, j) using Equation from block 116. Noise in the form of guided waves is isolated from the intermediate amplitude matrix temp (i, j) using Equation 2.

Scholte/Rayleigh Wave Isolation

In the case of isolating noise in the form of Scholte/Rayleigh waves, wavelet amplitude coefficients of the intermediate amplitude matrix temp (i, j) that are estimated as being signal are scaled down at block 110.

For any actual wavelet amplitude coefficient at frequency f (associated with index i) and time t (associated with index j), if the corresponding scaled amplitude is less than a scaling amplitude threshold NAMPTH, and the frequency f is less than the maximum expected frequency of the Scholte/Rayleigh wave, FMAX_SR, then that wavelet amplitude coefficient is scaled down in order to attenuate the associated Scholte/Rayleigh wave contribution. As an example, the scaling is exponential, as provided by Equation 3:

$$CWT(i,j)=\text{temp}(i,j)*CWT(i,j)$$

where $$\text{temp}(i,j)=e^{(-abs(FMAX\_SR-f))} \text{ if } [(\text{temp}(i,j)<\text{NAMPTH})$$
$$\text{and } f<FMAX\_SR], \text{ otherwise temp}(i,j)=1 \quad \text{Eq. 3}$$

Therefore, data associated with signal may be exponentially scaled down while data associated with noise in the form of Scholte/Rayleigh waves is left untouched.

Guided Wave Isolation

Noise in the form of guided waves is isolated in a manner similar to that of Scholte/Rayleigh waves in that data of the signal is scaled down while data of the guided waves is left untouched. At block 110, the intermediate amplitude matrix temp (i, j) resulting from Equation 2 is received. For any actual wavelet amplitude coefficient at frequency f (associated with index i) and time t (associated with index j), if the corresponding scaled amplitude is less than a scaling amplitude threshold NAMPTH, and the frequency f is greater than the estimated minimum frequency of the guided wave arrivals FMINGW, then that wavelet amplitude coefficient is scaled down in order to attenuate the associated guided wave contribution. As an example, the scaling is exponential, as provided by Equation 4:

$$CWT(i,j) = \text{temp}(i,j) * CWT(i,j)$$

where $$\text{temp}(i,j) = e^{(-f^*f)} \text{ if } [(\text{temp}(i,j) < \text{NAMPTH}) \& f > \text{FMINGW}], \text{ Otherwise temp}(i,j) = 1 \quad \text{Eq. 4}$$

In some embodiments, the noise from both Scholte/Rayleigh waves and guided waves are isolated so that noise from each type of wave can be filtered out. In such embodiments, both the noise from Scholte/Rayleigh waves (Eqs. 1 and 3) and from guided waves (Eqs. 1, 2 and 4) are individually calculated and therefore isolated. For example, determination of the Scholte/Rayleigh wave noise may provide a first isolated matrix and determination of the guided wave noise may provide a second isolated matrix.

Referring now to block 112 of FIG. 1, an inverse time-frequency transform is performed on any of the matrices generated at block 110. For example, an inverse time-frequency transform is applied to a first isolated matrix corresponding to Scholte/Rayleigh wave noise and/or a second isolated matrix corresponding to guided wave noise. The inverse-time frequency-transform is operable to transform the noise model back into the time domain. As a non-limiting example, the inverse time-frequency transform is an inverse continuous wavelet transform.

Next, at block 114, the noise model from the inverse time-frequency transform(s) is subtracted from the raw seismic data to yield an initial estimate of the signal data in the form of filtered data. The filtered data removes the noise from Scholte/Rayleigh waves and/or guided waves to provide a more accurate depiction of geological features. The filtered data may then be utilized by personnel to make decisions, such as where to drill a well and what type of well to drill. Wells drilled based on the filtered data may be more productive due to the removal of the Scholte/Rayleigh wave noise and/or the guided wave noise because they are more optimally configured due to a more accurate picture of the features below the Earth's surface. Additionally, the filtered data may reduce the time and cost for exploration of a field because reservoirs may be more quickly and accurately identified due to the more reliable filtered data.

It is noted that typical raw seismic data for interface waves (i.e., Scholte/Rayleigh wave and/or guide waves) are cross-spread gather which are formed out of a multitude of shot points and receiver cables. However, the maximum and minimum of each ensemble may be strongly biased by the strong amplitude of near-shots (i.e., vibration sources relatively close to a receiver cable) resulting in inadequate filtering of Scholte/Rayleigh waves for far-shots (i.e., vibration sources relatively far from a receiver cable). Accordingly, in some embodiments, the estimated noise found in block 110 may be re-evaluated in the time domain.

Figure 2:
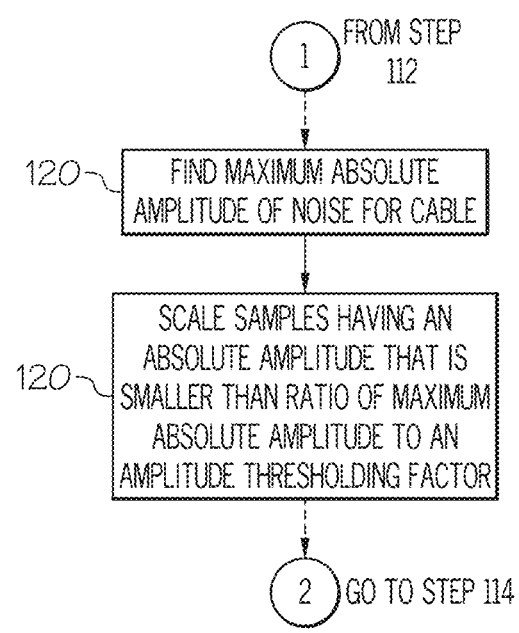
FIG. 2 depicts a flowchart illustrating an example method for scaling amplitudes of a noise model in the time domain according to one or more embodiments described and illustrated herein.

FIG. 2 illustrates an example process of re-evaluating the estimated noise found in block 110 in the time domain. After the estimated noise is transformed back into the time domain at block 112 of FIG. 1, the process moves to block 120 of FIG. 2. At block 120, the maximum amplitude MAXM for the noise of a particular receiver cable (i.e., a particular seismic sensor) in the time domain is determined. Next, at block 122, the amplitude of each sample from the estimated noise received from block 112 of FIG. 1 is compared to a noise model amplitude thresholding factor NSTHRD. Samples of the estimated noise having an absolute amplitude that is smaller than the ratio of MAMX/NSTHRD are considered to be noise and are scaled down, thus effectively reducing the signal leakage into the estimated noise. In some embodiments, the scaling at block 120 is exponential. Finally, the process moves to block 114 of FIG. 1.

The value for NSTHRD may be determined empirically. It is noted that the larger the value of NSTHRD, the lesser the amount of signal, if any, that will be recovered from the initial noise model received from block 112. A very small value of NSTHRD (e.g., less than 50) corresponds to a conservative approach to noise attenuation. The value of NSTHRD should be closely evaluated during the testing phase to avoid creating spikes that will end up in the filtered data after subtraction at block 114 of FIG. 1. Completing this analysis on each receiver cable from the noise "ensemble" generated in block 112 of FIG. 1 yields the final estimated noise model which is then subtracted from the input data to obtain the filtered data as an output at block 114.

Figure 3C:
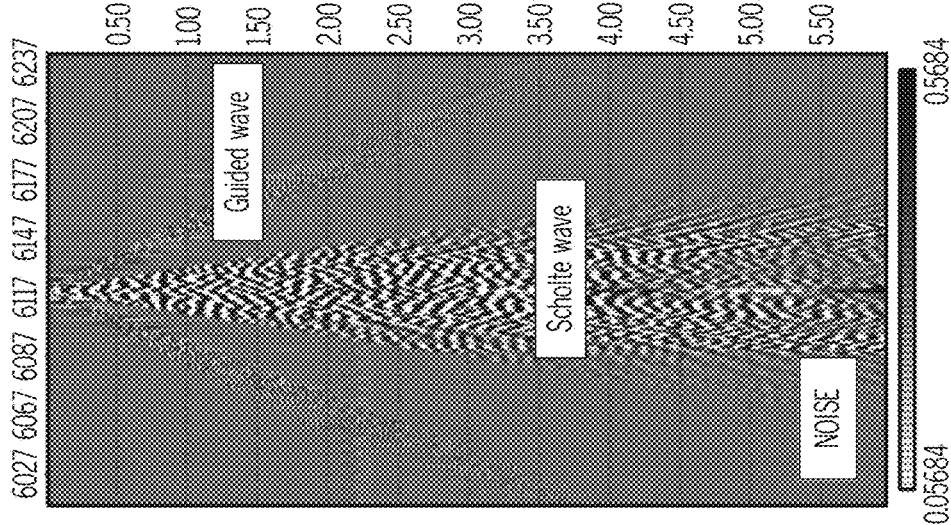
FIG. 3C graphically illustrates the noise model isolated from the input seismic data of FIG. 3A according to one or more embodiments described and illustrated herein.
Figure 3B:
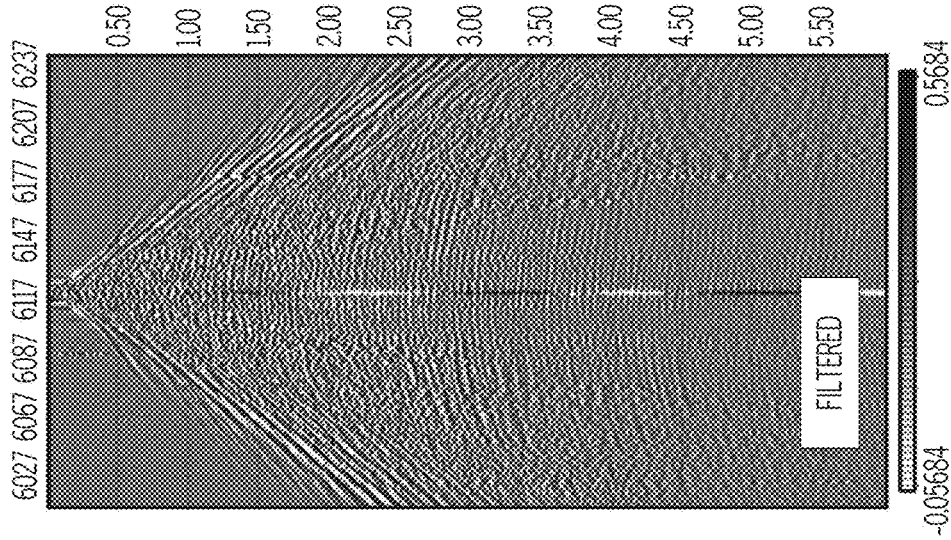
FIG. 3B graphically illustrates filtered data with the noise model removed from the seismic data of FIG. 3A according to one or more embodiments described and illustrated herein.
Figure 3A:
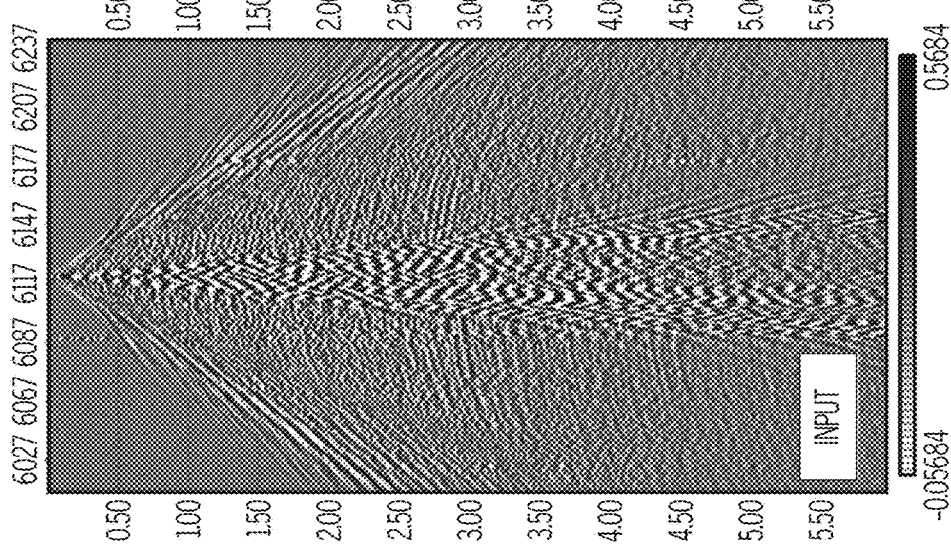
FIG. 3A graphically illustrates input seismic data from a geophone (vertical component) of an ocean bottom cable (OBC) survey according to one or more embodiments described and illustrated herein.

Referring now to FIG. 3A, example raw seismic data from a near geophone (vertical component) of an ocean bottom cable (OBC) survey is illustrated. It is evident from FIG. 3A that there is significant noise in the form of Scholte waves in the middle of the trace. FIG. 3C illustrates a noise model in the time domain that is extracted and isolated from the raw seismic data in FIG. 3A by the process of FIGS. 1 and 2. It is noted that both Scholte waves and guided waves were isolated and combined into the noise model shown in FIG. 3B. FIG. 3C clearly illustrates the presence of Scholte waves and guided waves in the noise model. There is no noticeable signal leaking into the noise model of FIG. 3C. FIG. 3B shows the noise model of FIG. 3C subtracted from the raw seismic data of FIG. 3A (i.e., signal data), which provides more valuable signal data with the removal of noise.

Figure 4A:
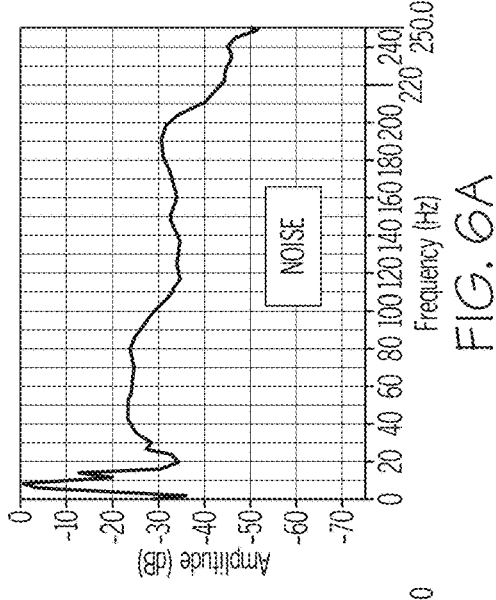
FIGS. 4A and 4B graphically illustrate the frequency spectra of the seismic data of FIG. 3A according to one or more embodiments described and illustrated herein.
Figure 5A:
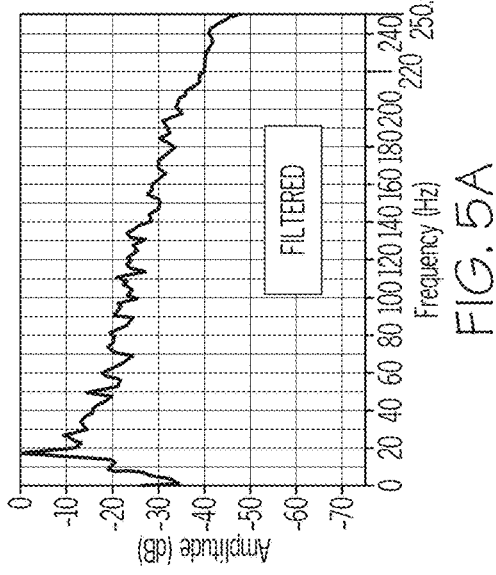
FIGS. 5A and 5B graphically illustrate the frequency spectra of the filtered data of FIG. 3B according to one or more embodiments described and illustrated herein.
Figure 6A:
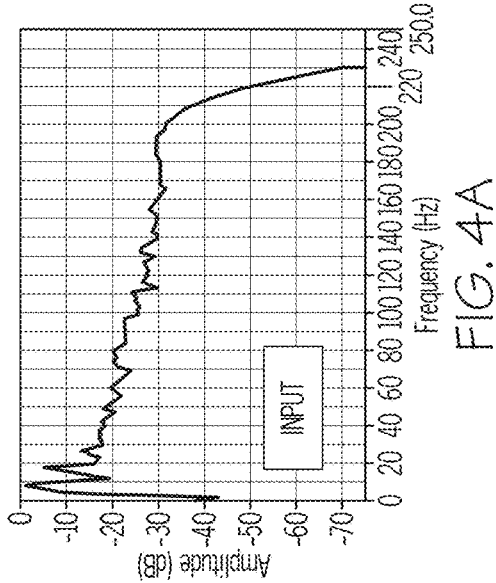
FIGS. 6A and 6B graphically illustrate the frequency spectra of the noise model of FIG. 3C according to one or more embodiments described and illustrated herein.
Figure 4B:
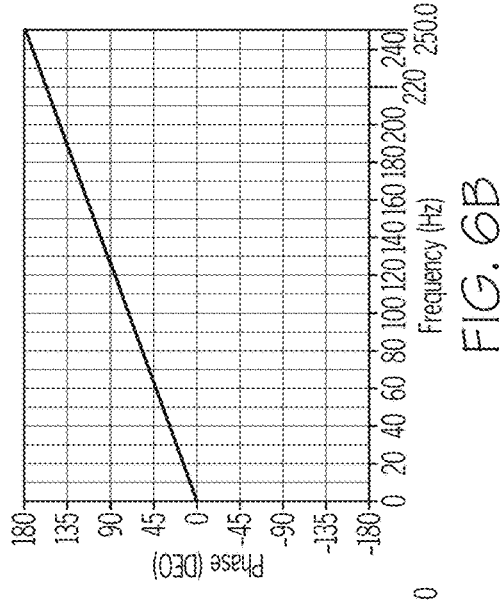
Figure 5B:
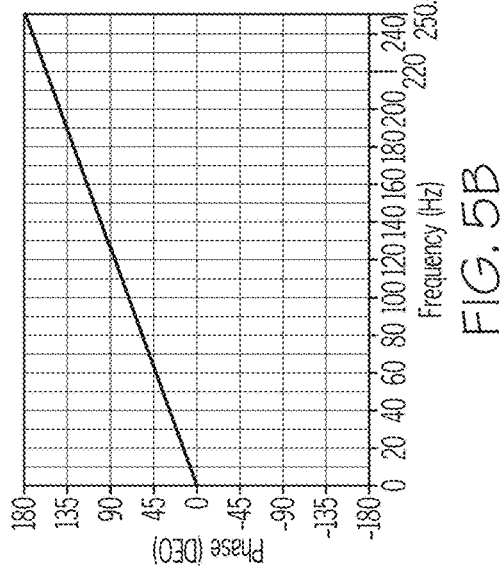
Figure 6B:
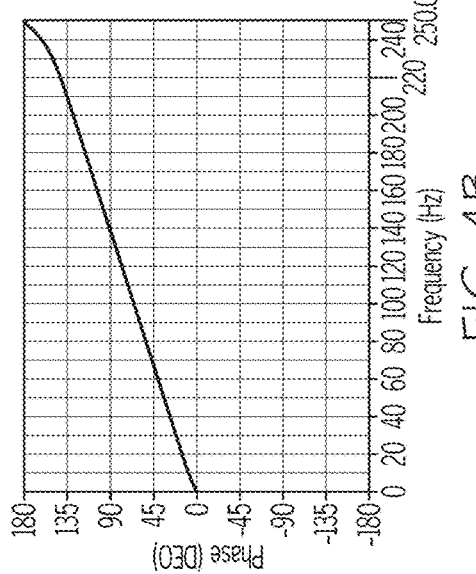

FIGS. 4A and 4B illustrate an example attenuation of Scholte and guided waves from the vertical geophone dataset in the OBC survey showing the frequency spectra of the seismic data gather of FIG. 3A. In both FIGS. 4A and 4B, the x-axis is frequency. In FIG. 4A, the y-axis is amplitude and in FIG. 4B the y-axis is phase. The plots of FIGS. 4A and 4B are of the raw seismic data and include both signal and noise. FIGS. 6A and 6B plot amplitude and phase versus frequency, respectively, of the noise model shown in FIG. 3C. FIGS. 5A and 5B similarly plot amplitude and phase versus frequency, respectively, of the filtered data shown in FIG. 3B. The filtering process has effectively attenuated the Scholte wave as shown by the high amplitude below 20 Hz in FIG. 6A

Figure 7C:
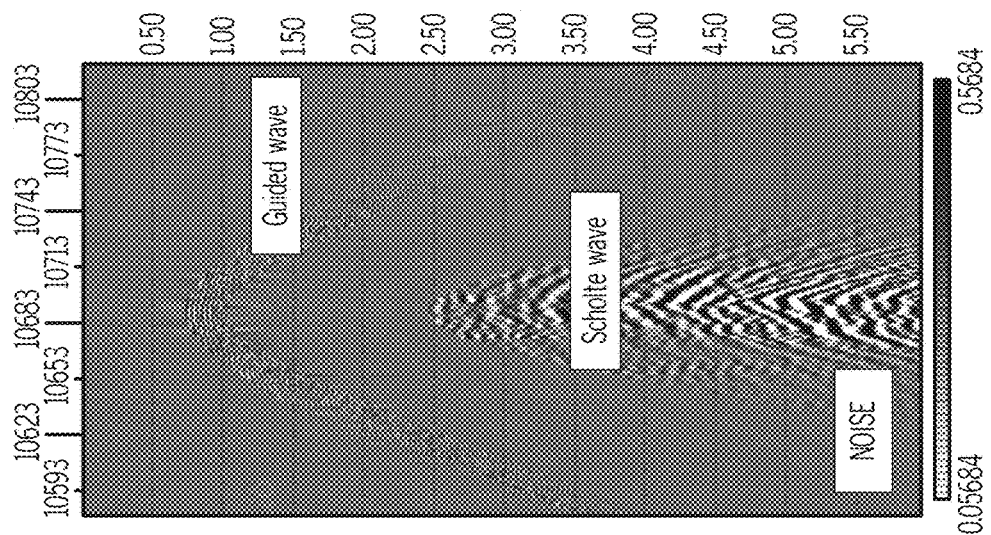
FIG. 7C graphically illustrates the noise model isolated from the input seismic data of FIG. 7A according to one or more embodiments described and illustrated herein.
Figure 7B:
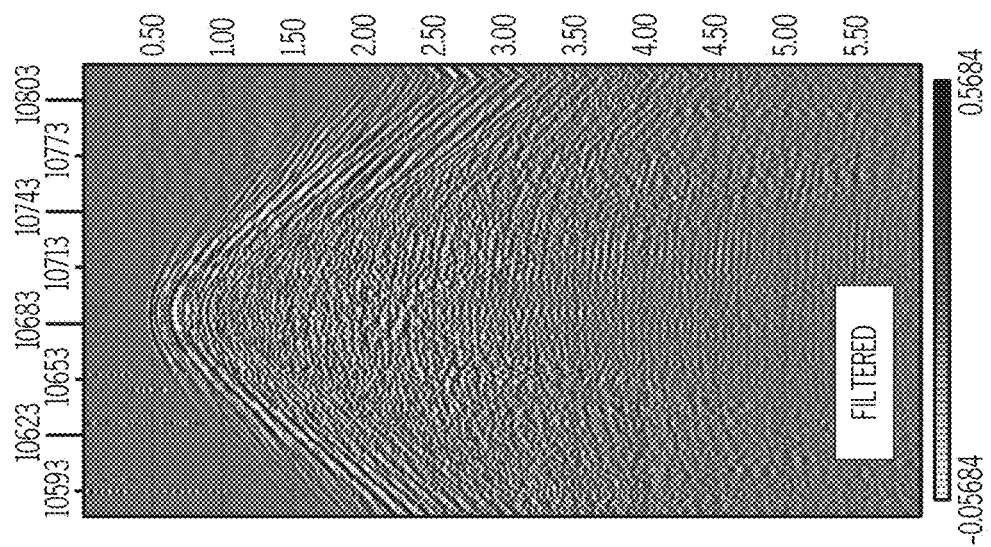
FIG. 7B graphically illustrates filtered data with the noise model removed from the seismic data of FIG. 7A according to one or more embodiments described and illustrated herein.
Figure 7A:
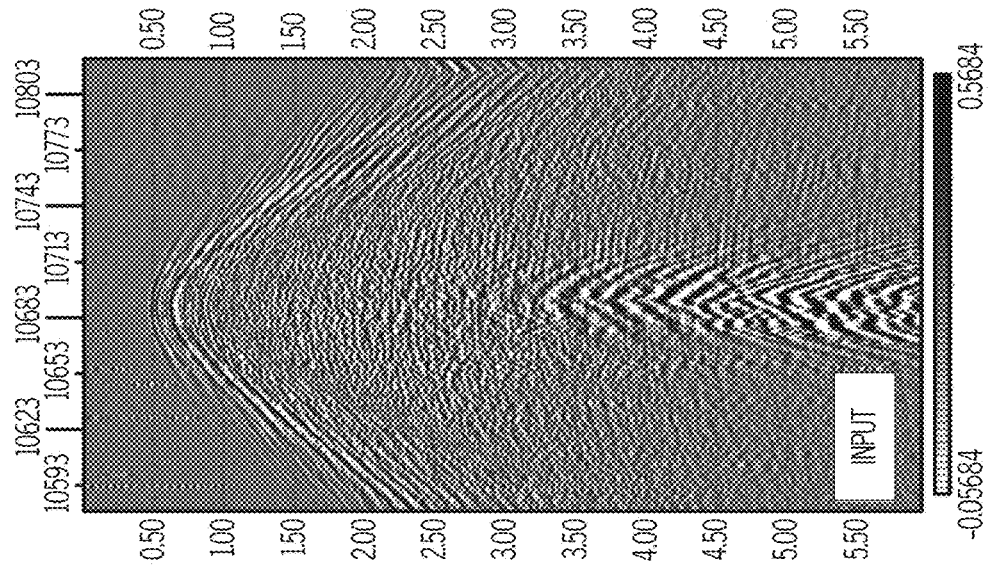
FIG. 7A graphically illustrates input seismic data from a geophone (vertical component) of an ocean bottom cable (OBC) survey according to one or more embodiments described and illustrated herein.

Referring now to FIG. 7A, example raw seismic data from a far geophone (vertical component) of an ocean bottom cable (OBC) survey is illustrated. It is evident from FIG. 7A that there is significant noise in the form of Scholte waves in the middle of the trace. FIG. 7C illustrates noise model in the time domain that is extracted and isolated from the raw seismic data in FIG. 7A by the process of FIGS. 1 and 2. It is noted that both Scholte waves and guided waves were isolated and combined into the noise model shown in FIG. 7B. FIG. 7C clearly illustrates the presence of Scholte waves and guided waves in the noise model. There is no noticeable signal leaking into the noise model of FIG. 7C. FIG. 7B shows the noise model of FIG. 7C subtracted from the raw seismic data of FIG. 7A, which provides more valuable signal data with the removal of noise.

Figure 8A:
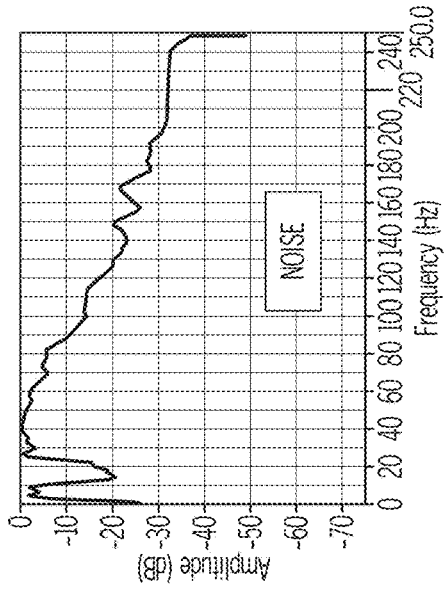
FIGS. 8A and 8B graphically illustrate the frequency spectra of the seismic data of FIG. 7A according to one or more embodiments described and illustrated herein.
Figure 8B:
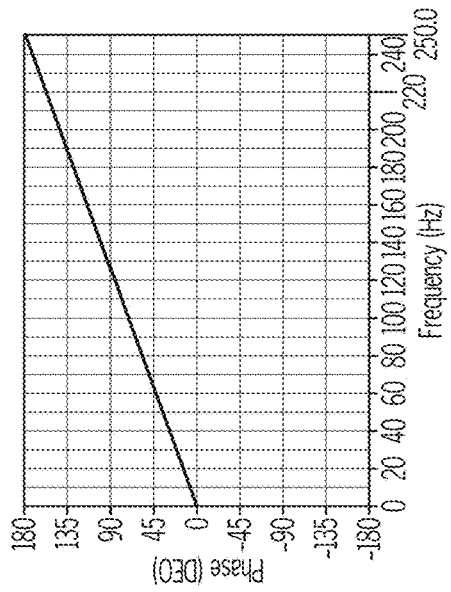
Figure 9A:
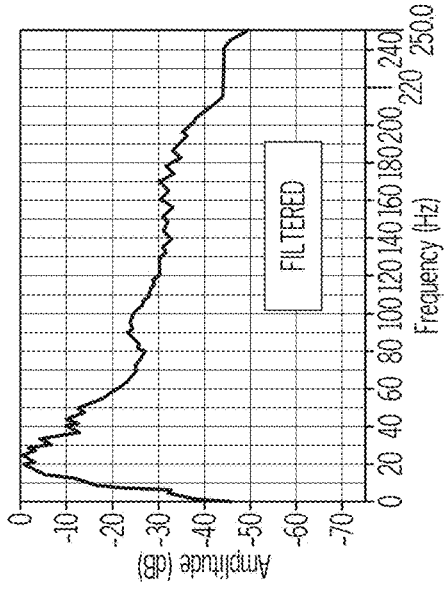
FIGS. 9A and 9B graphically illustrate the frequency spectra of the filtered data of FIG. 7B according to one or more embodiments described and illustrated herein.
Figure 9B:
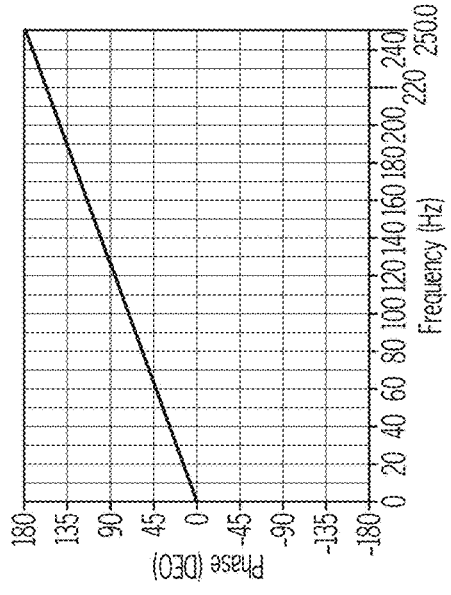
Figure 10A:
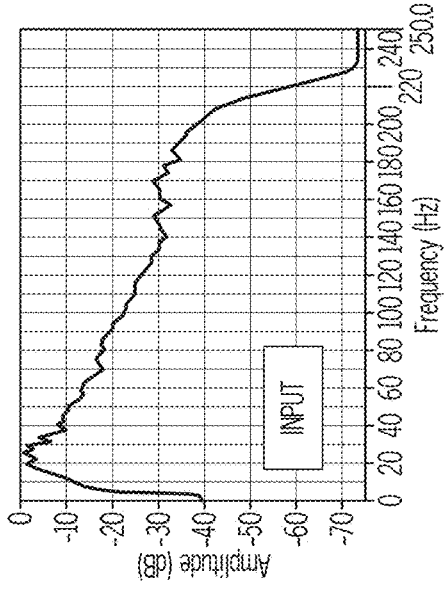
FIGS. 10A and 10B graphically illustrate the frequency spectra of the noise model of FIG. 7C according to one or more embodiments described and illustrated herein.
Figure 10B:
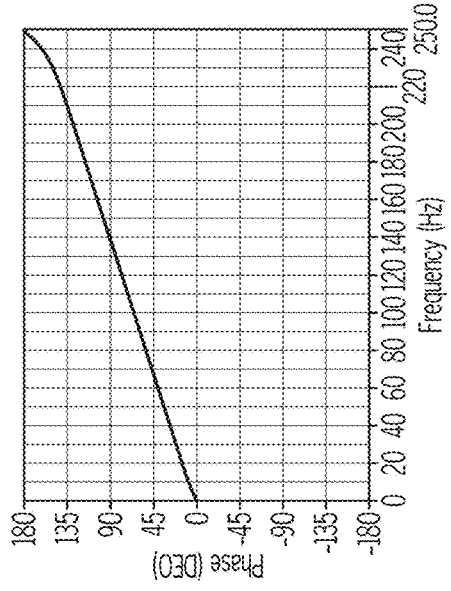

FIGS. 8A and 8B illustrate an example attenuation of Scholte and guided waves from the vertical geophone dataset in the OBC survey showing the frequency spectra of the seismic data gather of FIG. 7A. In both FIGS. 8A and 8B, the x-axis is frequency. In FIG. 4A, the y-axis is amplitude and in FIG. 4B the y-axis is phase. The plots of FIGS. 8A and 8B are of the raw seismic data and include both signal and noise. FIGS. 10A and 10B plot amplitude and phase versus frequency, respectively, of the noise model shown in FIG. 7C. FIGS. 9A and 9B similarly plot amplitude and phase versus frequency, respectively, of the filtered data shown in FIG. 7B.

Figure 11C:
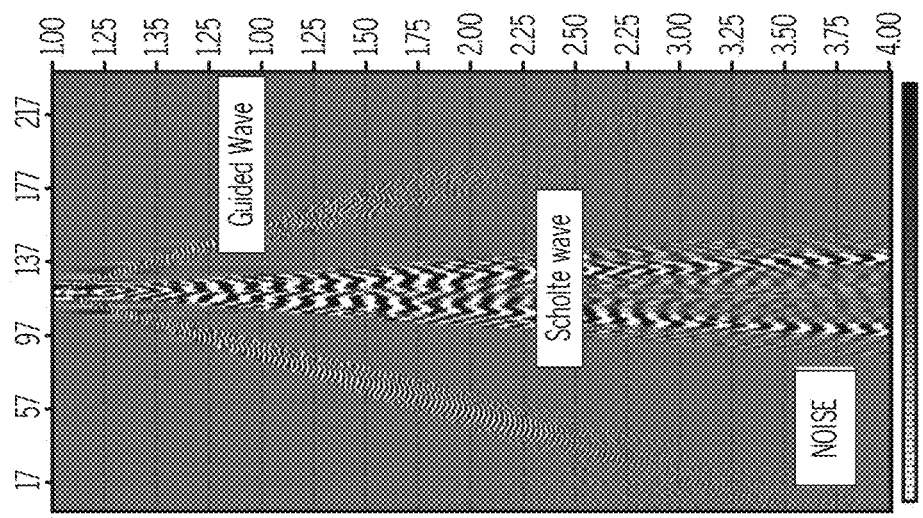
FIG. 11C graphically illustrates the noise model isolated from the input seismic data of FIG. 11A according to one or more embodiments described and illustrated herein.
Figure 11B:
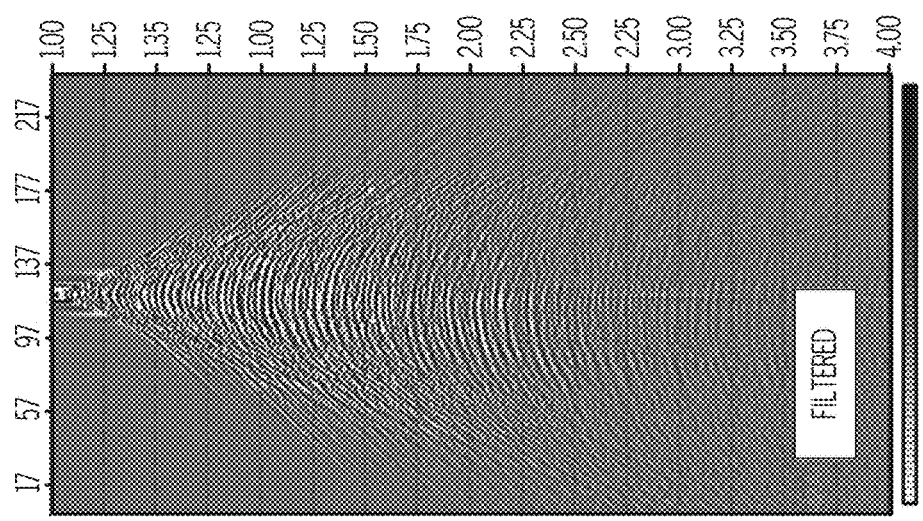
FIG. 11B graphically illustrates filtered data with the noise model removed from the seismic data of FIG. 11A according to one or more embodiments described and illustrated herein.
Figure 11A:
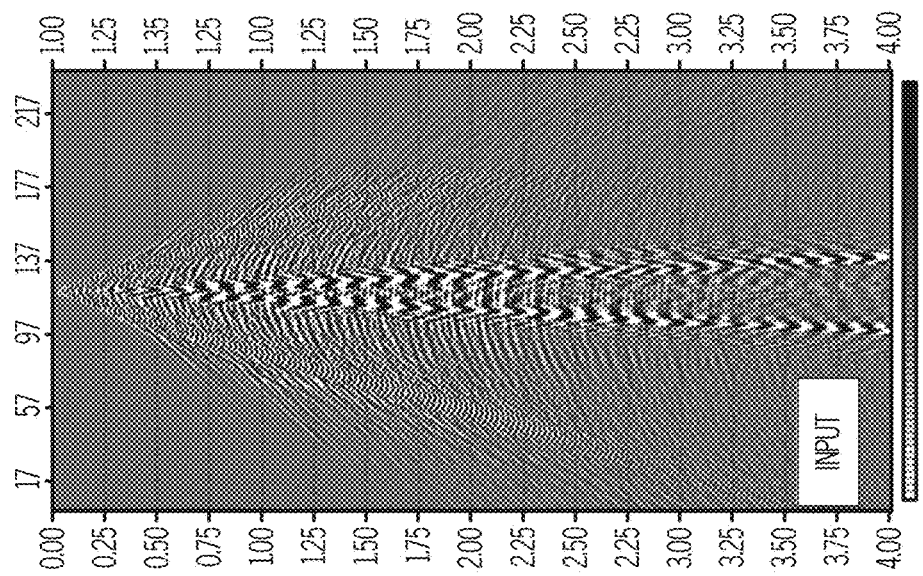
FIG. 11A graphically illustrates an input seismic data from a hydrophone of an ocean bottom cable (OBC) survey according to one or more embodiments described and illustrated herein.

Referring now to FIG. 11A, example raw seismic data from a hydrophone (i.e., a near cable) of an ocean bottom cable (OBC) survey is illustrated. It is evident from FIG. 11A that there is significant noise in the form of Scholte waves in the middle of the trace. There is some evidence of guided wave noise. FIG. 11C illustrates the noise model in the time domain that is extracted and isolated from the raw seismic data in FIG. 11A by the process of FIGS. 1 and 2. It is noted that both Scholte waves and guided waves were isolated and combined into the noise model shown in FIG. 11B. FIG. 11C clearly illustrates the presence of Scholte waves and guided waves in the noise model. There is no noticeable signal leaking into the noise model of FIG. 11C. FIG. 11B shows the noise model of FIG. 11C subtracted from the raw seismic data of FIG. 11A, which provides more valuable signal data with the removal of noise.

Figure 14A:
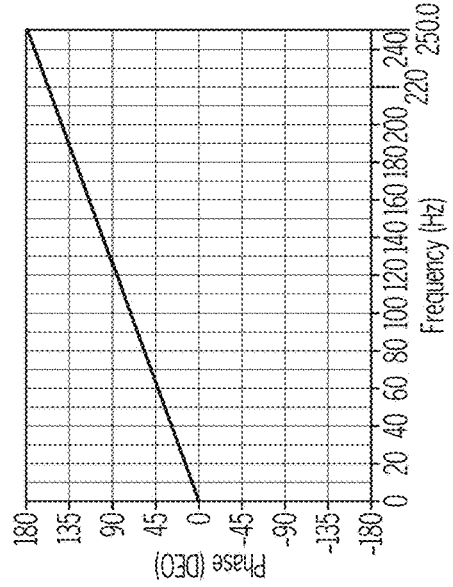
FIGS. 14A and 14B graphically illustrate the frequency spectra of the noise model of FIG. 11C according to one or more embodiments described and illustrated herein.
Figure 14B:
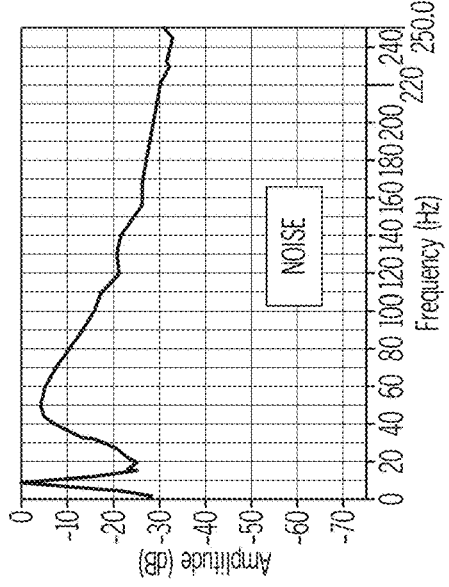
Figure 13A:
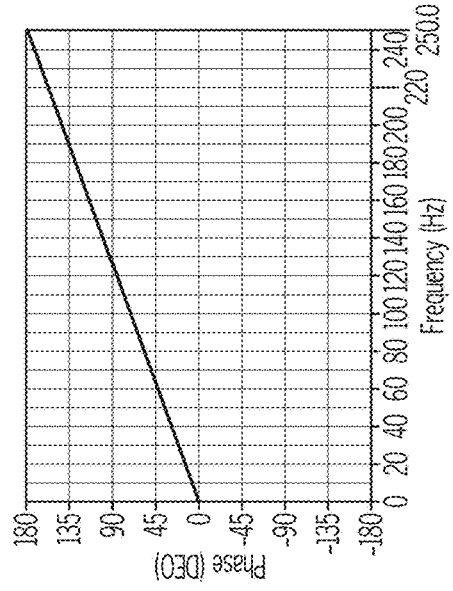
FIGS. 13A and 13B graphically illustrate the frequency spectra of the filtered data of FIG. 11B according to one or more embodiments described and illustrated herein.
Figure 13B:
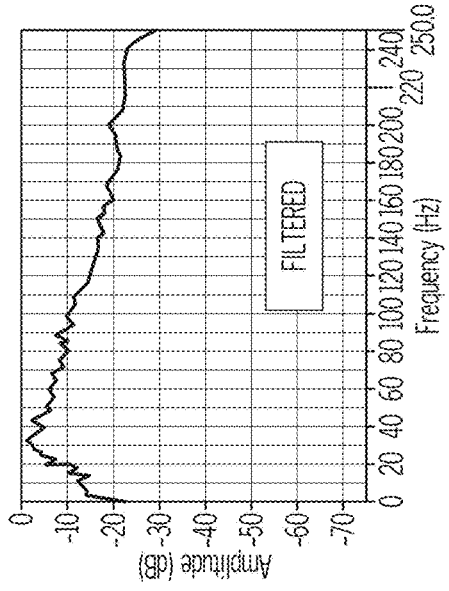
Figure 12B:
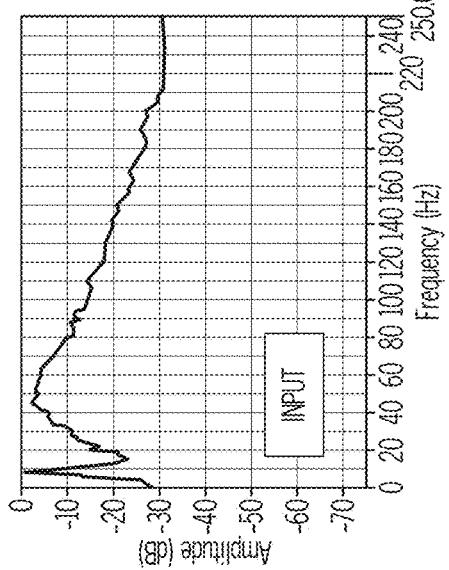

FIGS. 12A and 12B illustrate an example attenuation of Scholte and guided waves from the hydrophone dataset in an OBC survey showing the frequency spectra of the seismic data gather of FIG. 11A. In both FIGS. 12A and 12B, the x-axis is frequency. In FIG. 12A, the y-axis is amplitude and in FIG. 12B the y-axis is phase. The plots of FIGS. 12A and 12B are of the raw seismic data and include both signal and noise. FIGS. 14A and 14B plot amplitude and phase versus frequency, respectively, of the noise model shown in FIG. 11C. FIGS. 13A and 13B similarly plot amplitude and phase versus frequency, respectively, of the filtered data shown in FIG. 11B.

Figure 15A:
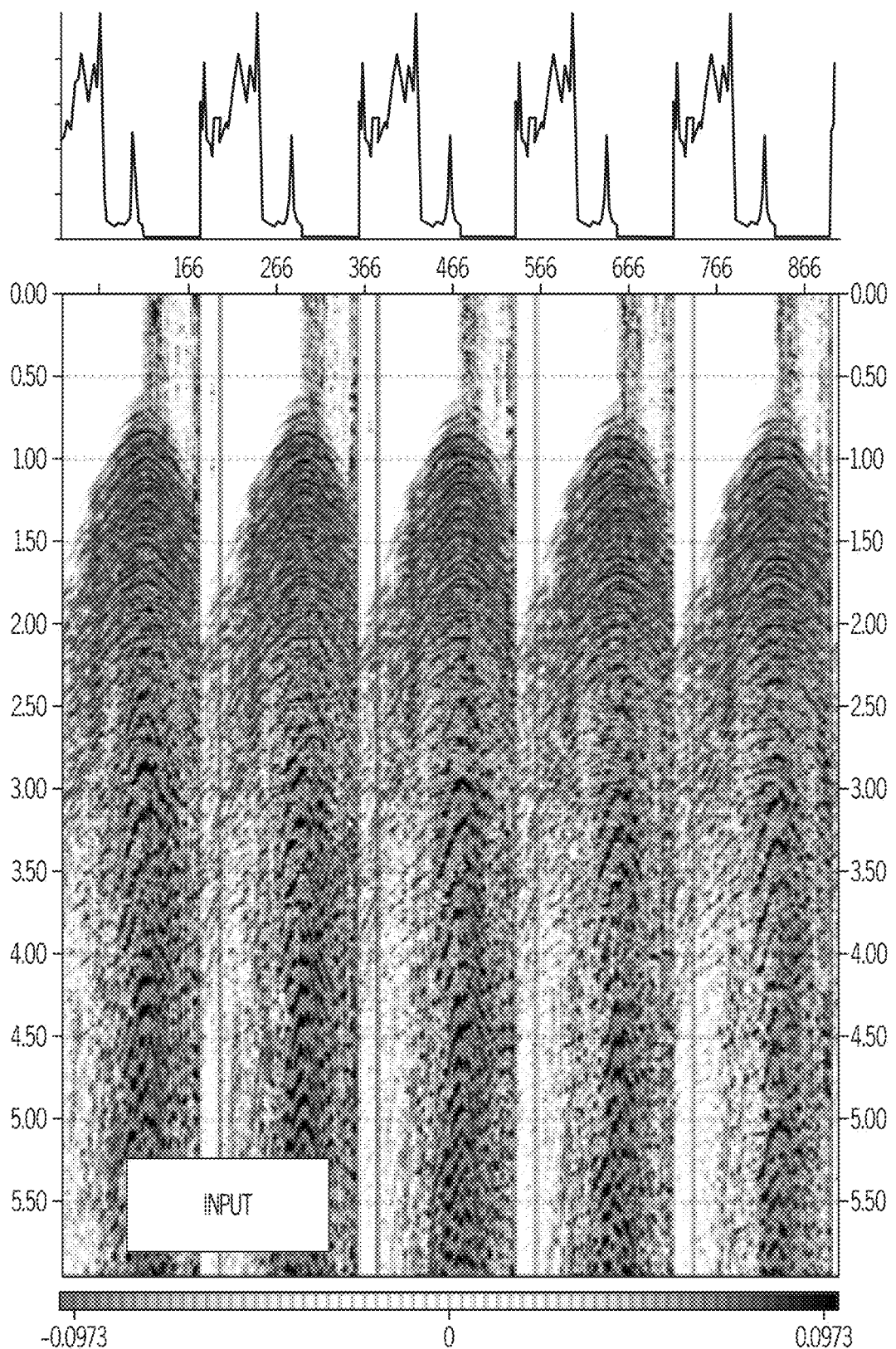
FIG. 15A graphically illustrates an input seismic data from a far-offset geophone receiver of ocean transition survey according to one or more embodiments described and illustrated herein.
Figure 15B:
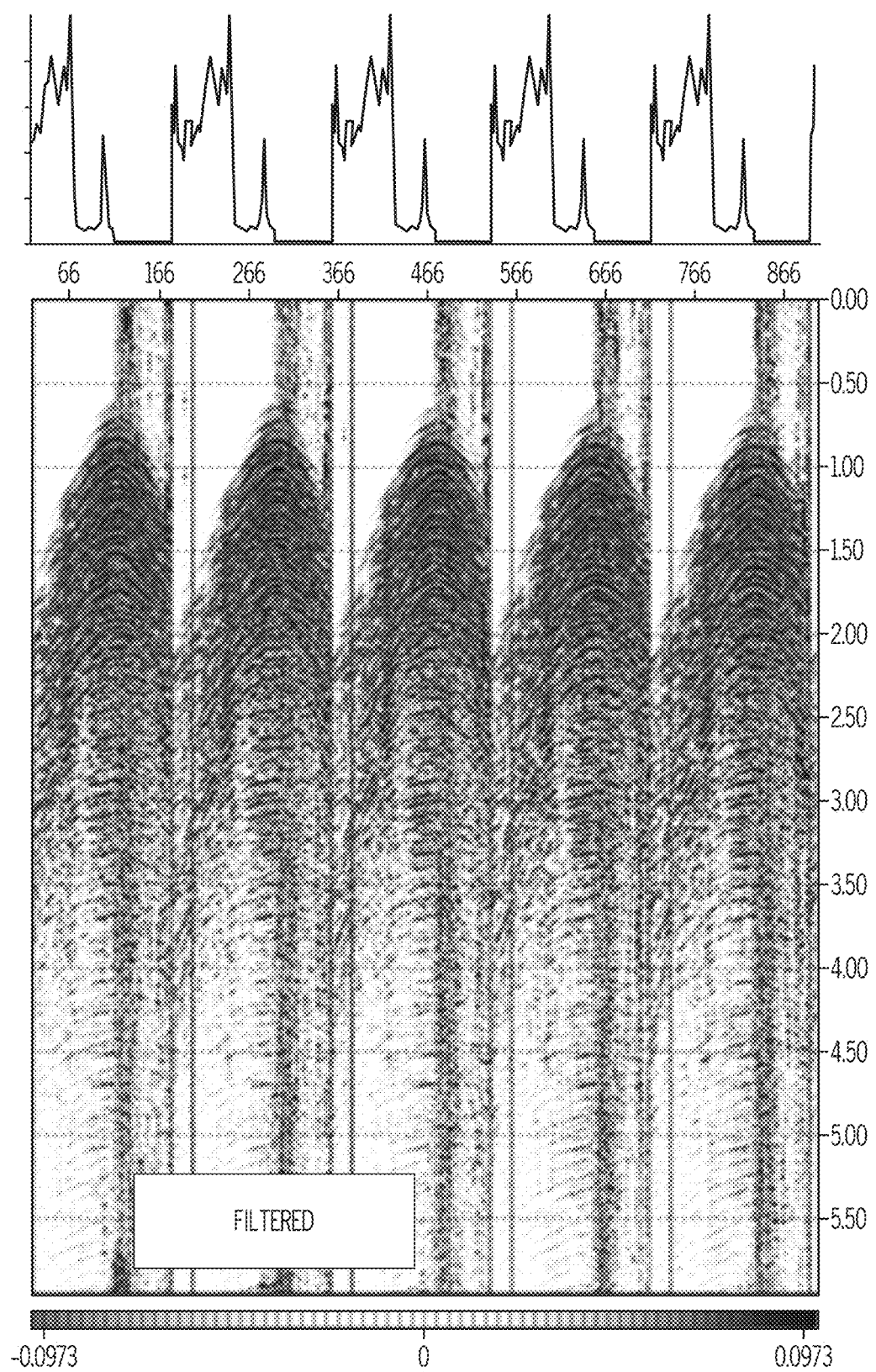
FIG. 15B graphically illustrates filtered data with the noise model removed from the seismic data of FIG. 15A according to one or more embodiments described and illustrated herein.
Figure 15C:
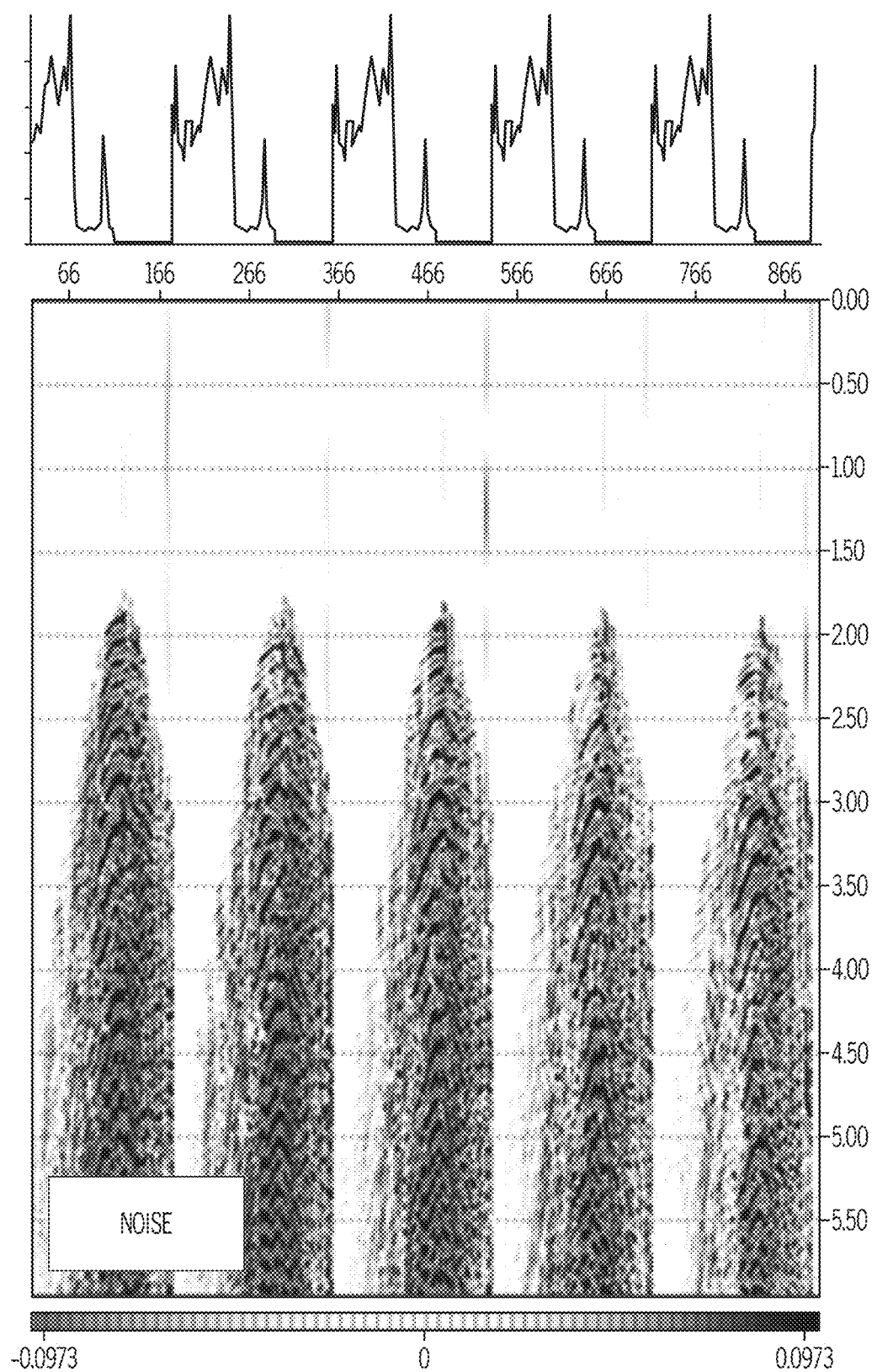
FIG. 15C graphically illustrates the noise model isolated from the input seismic data of FIG. 15A according to one or more embodiments described and illustrated herein.

Referring now to FIG. 15A, example raw seismic data from far-offset geophone cables in an ocean transition survey is illustrated. FIG. 15A illustrates five individual traces of raw seismic data generated by the cables. FIG. 15C illustrates the noise model in the time domain that is extracted and isolated from the raw seismic data in FIG. 15A by the process of FIGS. 1 and 2. FIG. 15C clearly illustrates the presence of Scholte waves in the noise model. The input data does not include guided waves from the water layer because of the gradual disappearance of the water layer. The survey layout went from relatively deep water (OBC, with the water layer being several dozens of meters thick), through the transition zone (water less than a meter) and into solid land (no water layer).

There is no noticeable signal leaking into the noise model of FIG. 15C. FIG. 15B shows the noise model of FIG. 15C subtracted from the raw seismic data of FIG. 15A, which provides more valuable signal data with the removal of noise.

Figure 18A:
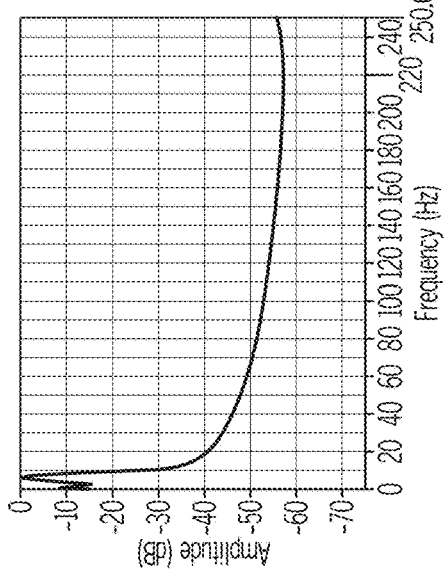
FIGS. 18A and 18B graphically illustrate the frequency spectra of the noise model of FIG. 15C according to one or more embodiments described and illustrated herein.
Figure 18B:
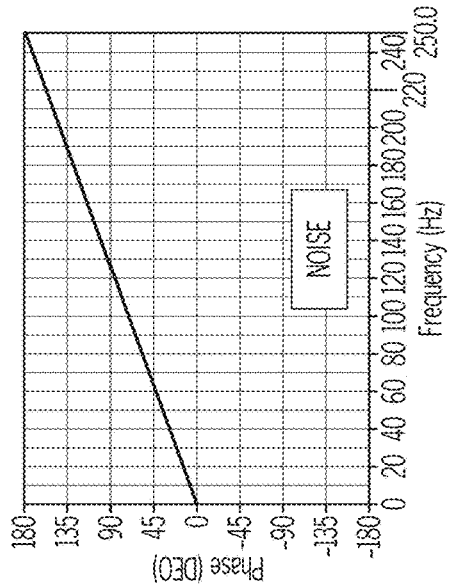
Figure 17A:
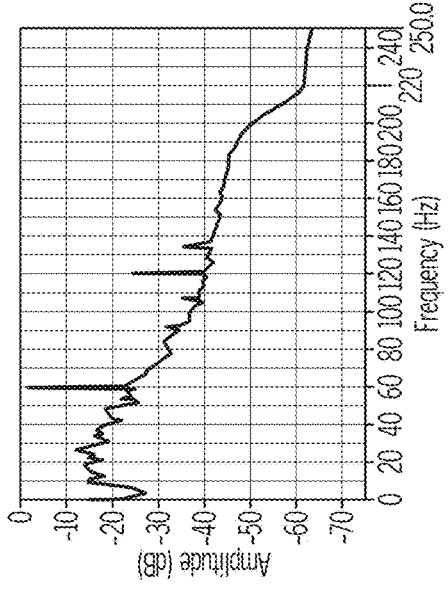
FIGS. 17A and 17B graphically illustrate the frequency spectra of the filtered data of FIG. 15B according to one or more embodiments described and illustrated herein.
Figure 17B:
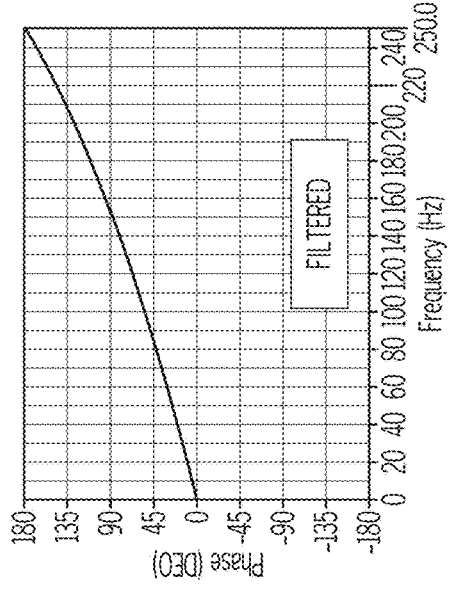
Figure 16A:
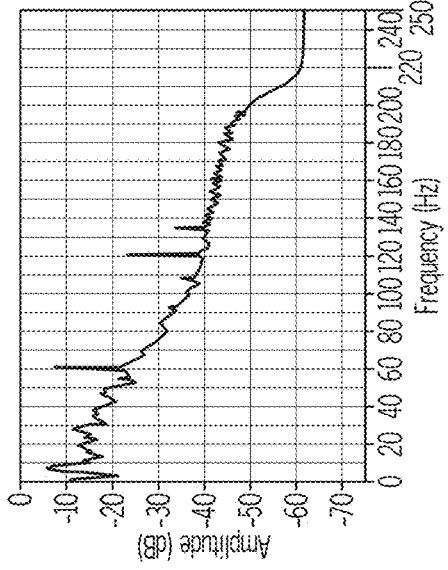
FIGS. 16A and 16B graphically illustrate the frequency spectra of the seismic data of FIG. 15A according to one or more embodiments described and illustrated herein.
Figure 16B:
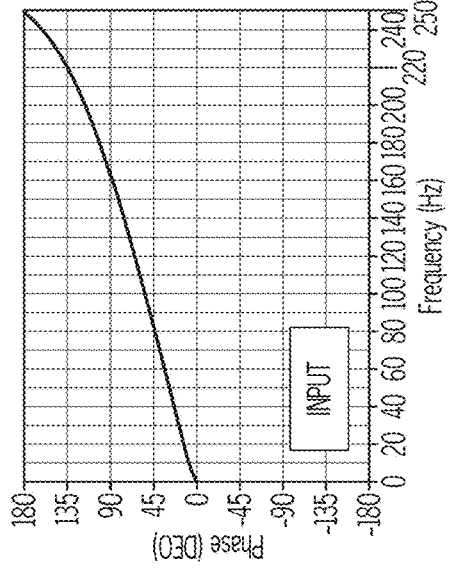

FIGS. 16A and 16B illustrate an example attenuation of Scholte and guided waves from the geophone dataset in the survey showing the frequency spectra of the seismic data gather of FIG. 15A. In both FIGS. 16A and 16B, the x-axis is frequency. In FIG. 16A, the y-axis is amplitude and in FIG. 16B the y-axis is phase. The plots of FIGS. 16A and 16B are of the raw seismic data and include both signal and noise. FIGS. 18A and 18B plot amplitude and phase versus frequency, respectively, of the noise model shown in FIG. 15C. FIGS. 17A and 17B similarly plot amplitude and phase versus frequency, respectively, of the filtered data shown in FIG. 15B.

Figure 19A:
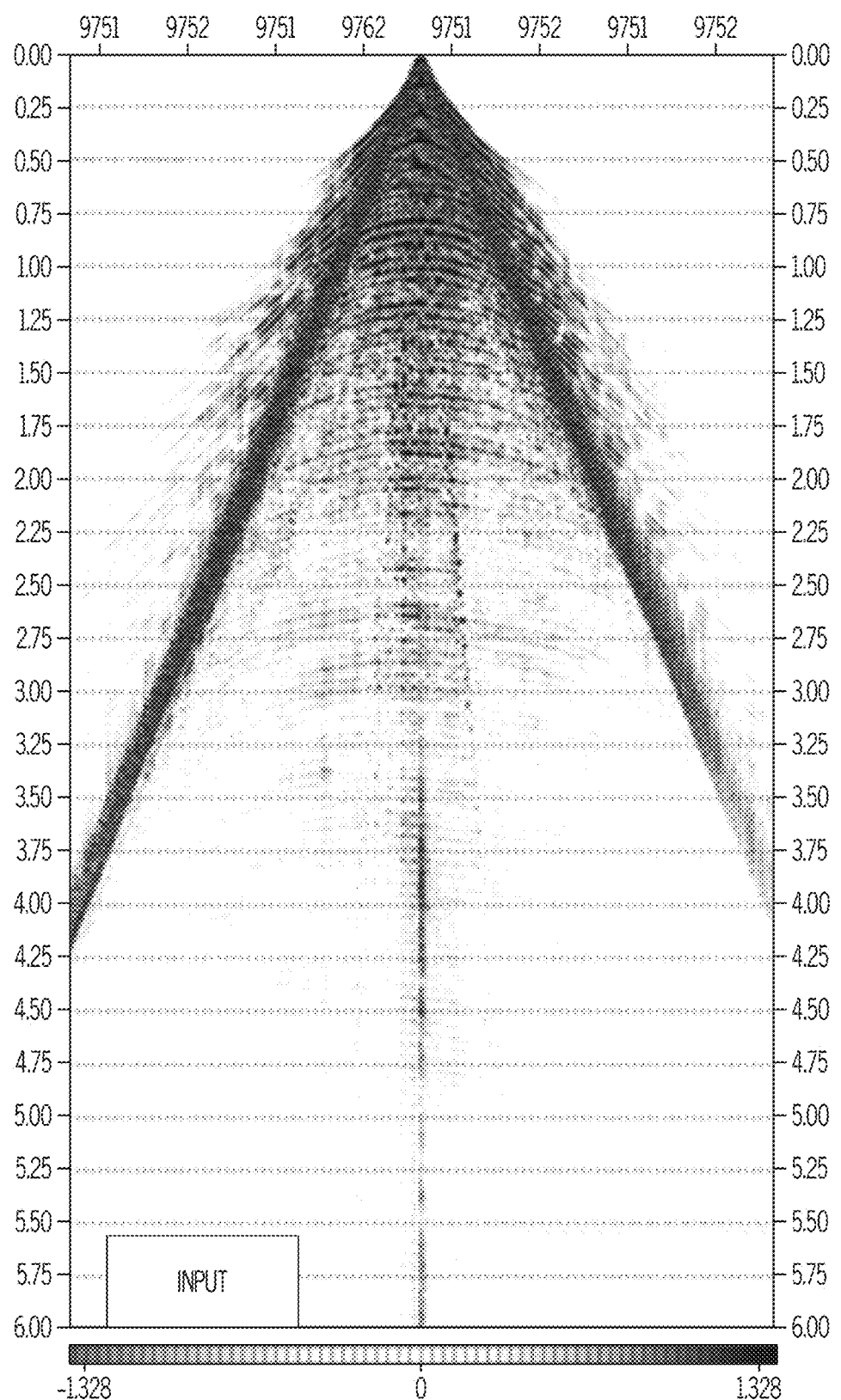
FIG. 19A graphically illustrates input seismic data from a near-offset hydrophone receiver of an OBC survey according to one or more embodiments described and illustrated herein.
Figure 19B:
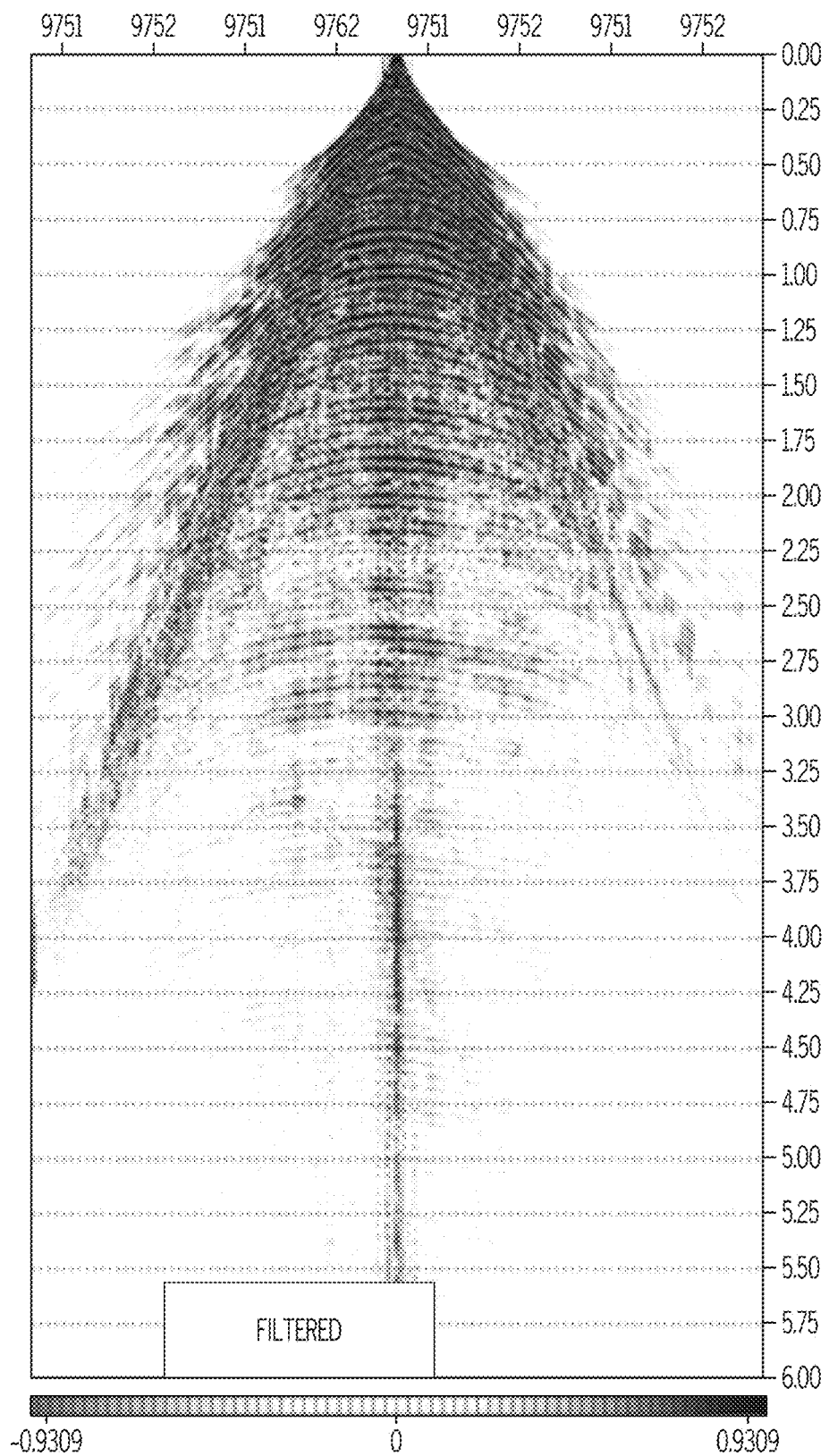
FIG. 19B graphically illustrates filtered data with the noise model removed from the seismic data of FIG. 19A according to one or more embodiments described and illustrated herein.
Figure 19C:
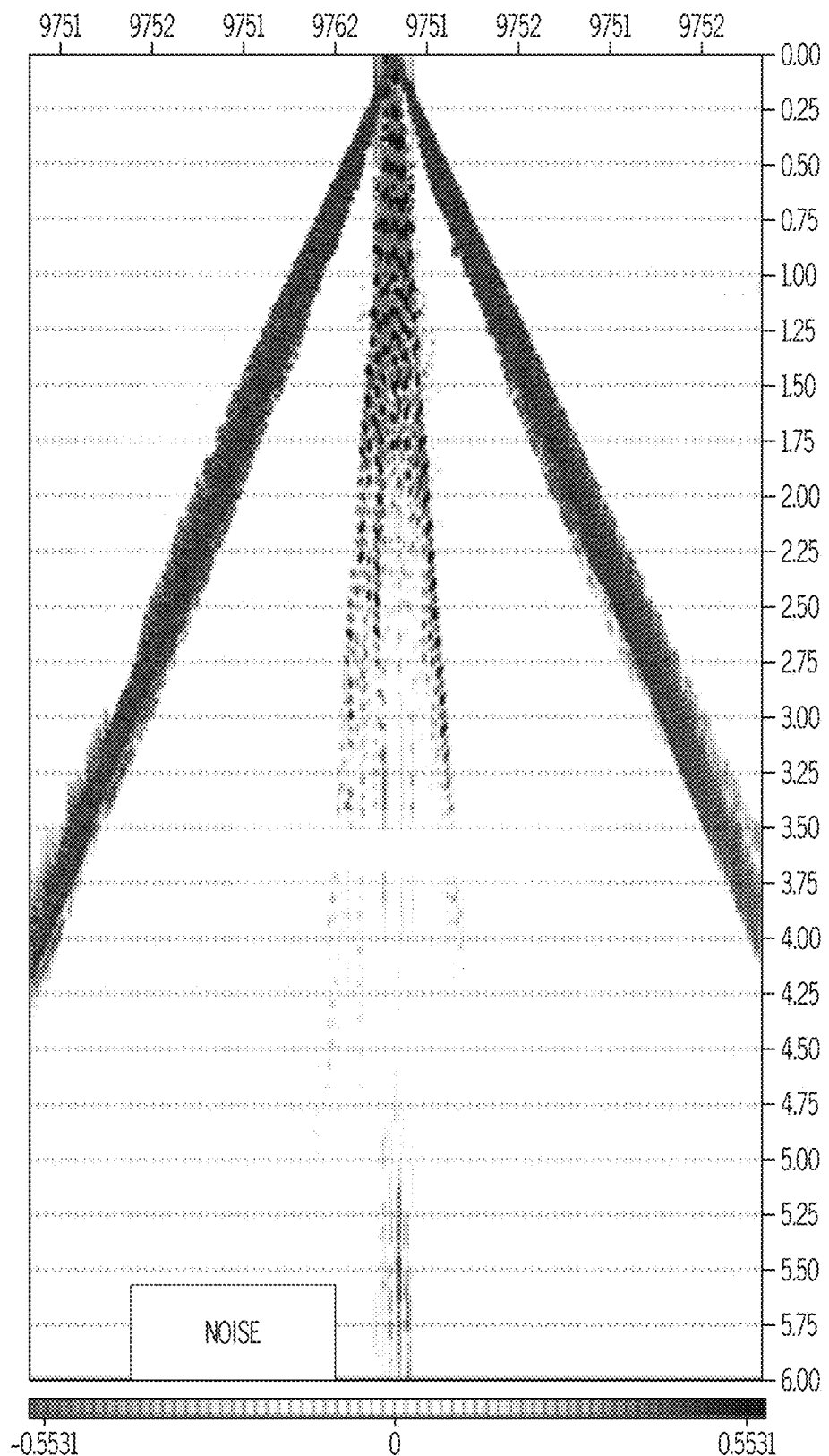
FIG. 19C graphically illustrates the noise model isolated from the input seismic data of FIG. 19A according to one or more embodiments described and illustrated herein.

Referring now to FIG. 19A, example raw seismic data from a near hydrophone (i.e., a near cable) of an ocean bottom cable (OBC) survey where guided waves are prominent is illustrated. It is evident from FIG. 19A that there is significant noise in the form of guided waves. FIG. 19C illustrates the noise model in the time domain that is extracted and isolated from the raw seismic data in FIG. 19A by the process of FIGS. 1 and 2. It is noted that both Scholte waves and guided waves were isolated and combined into the noise model shown in FIG. 11B. FIG. 19C clearly illustrates the significant presence of guided waves in the noise model. There is no noticeable signal leaking into the noise model of FIG. 19C. FIG. 19B shows the noise model of FIG. 19C subtracted from the raw seismic data of FIG. 19A, which provides more valuable signal data with the removal of noise.

Figure 22A:
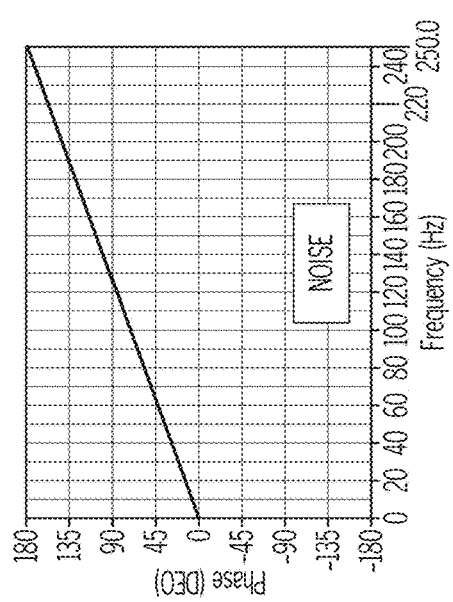
FIGS. 22A and 22B graphically illustrate the frequency spectra of the noise model of FIG. 19C according to one or more embodiments described and illustrated herein.
Figure 22B:
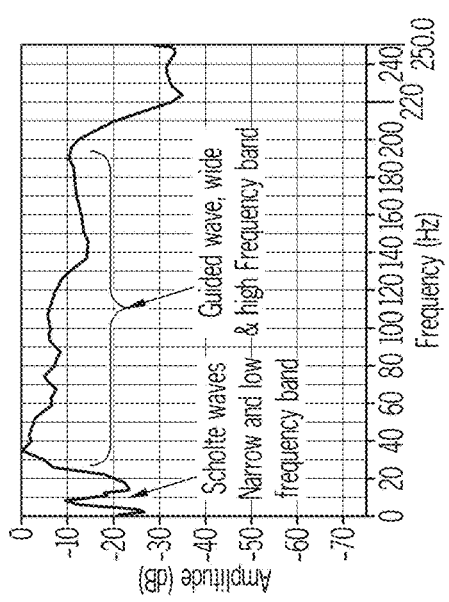
Figure 20A:
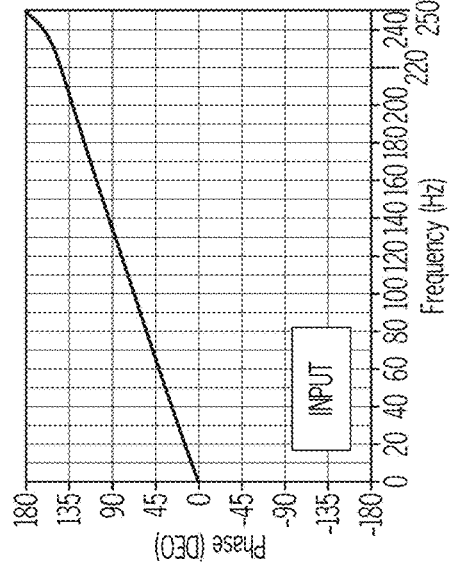
FIGS. 20A and 20B graphically illustrate the frequency spectra of the seismic data of FIG. 19A according to one or more embodiments described and illustrated herein.
Figure 20B:
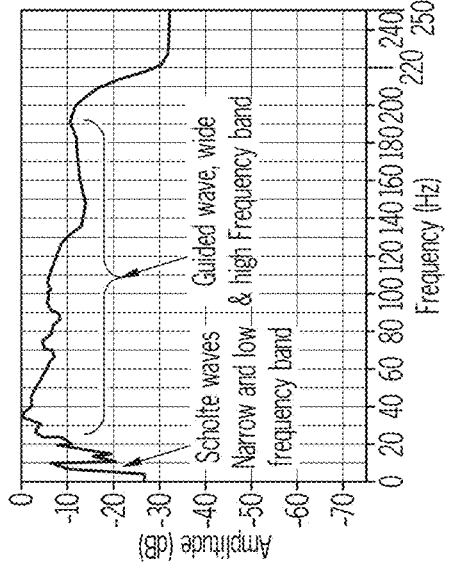

FIGS. 20A and 20B illustrate an example attenuation of Scholte and guided waves from the hydrophone dataset in the OBC survey showing the frequency spectra of the seismic data gather of FIG. 19A. In both FIGS. 20A and 20B, the x-axis is frequency. In FIG. 20A, the y-axis is amplitude and in FIG. 20B the y-axis is phase. The plots of FIGS. 20A and 20B are of the raw seismic data and include both signal and noise. FIGS. 22A and 22B plot amplitude and phase versus frequency, respectively, of the noise model shown in FIG. 19C. FIGS. 13A and 13B similarly plot amplitude and phase versus frequency, respectively, of the filtered data shown in FIG. 11B.

Figure 21A:
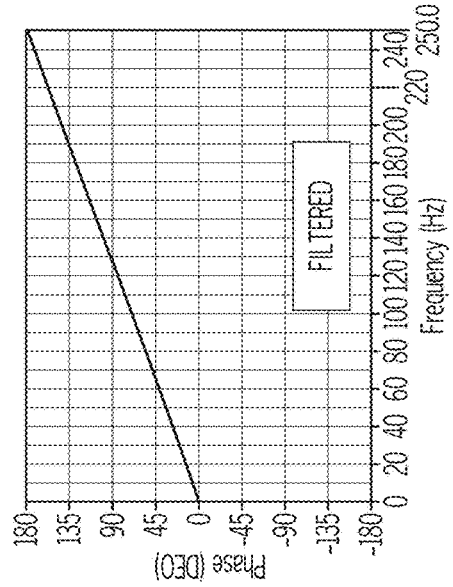
FIGS. 21A and 21B graphically illustrate the frequency spectra of the filtered data of FIG. 19B according to one or more embodiments described and illustrated herein.
Figure 21B:
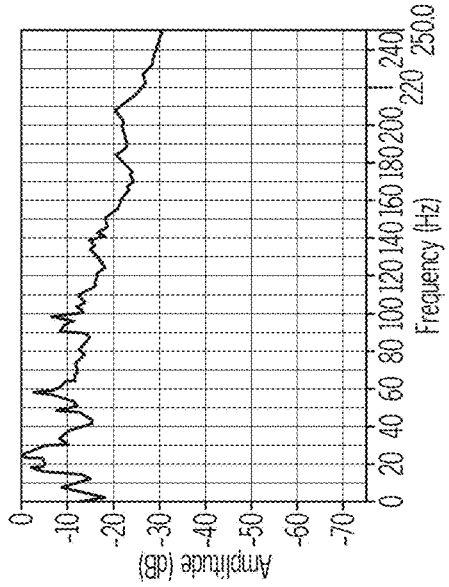

Comparing the average power spectrum of the raw seismic data of FIG. 20A with the average power spectrum of the noise of FIG. 22A, it is evident that the Scholte waves dominate the narrow and low frequency band and the guided waves dominate the wide and high frequency band. The noise of FIG. 22A significantly contributes to the plot of the average power spectrum shown of the raw seismic data shown in FIG. 20A. The removal of the noise represented by the Scholte and guided waves in the plot of FIG. 21A significantly changes the plot as compared to the plot of FIG. 20A. Therefore, the plots of FIGS. 21A and 21B provide a more accurate picture than those of FIGS. 20A and 20B.

Embodiments of the present disclosure may be implemented by a computing device, and may be embodied as computer-readable instructions stored on a non-transitory memory device. FIG. 23 depicts an example computing device 200 configured to perform the functionalities described herein. The example computing device 200 provides a system for filtering interface waves from seismic data, and/or a non-transitory computer-usable medium having computer readable program code for filtering interface waves from seismic data embodied as hardware, software, and/or firmware, according to embodiments shown and described herein. While in some embodiments, the computing device 200 may be configured as a general purpose computer with the requisite hardware, software, and/or firmware. In some embodiments, the computing device 200 may be configured as a special purpose computer designed specifically for performing the functionalities described herein. It should be understood that the software, hardware, and/or firmware components depicted in FIG. 23 may also be provided in other computing devices external to the computing device 200 (e.g., data storage devices, remote server computing devices, and the like).

As also illustrated in FIG. 23, the computing device 200 (or other additional computing devices) may include a processor 230, input/output hardware 232, network interface hardware 234, a data storage component 236 (which may include sample data 238A, parameter data 238B and any other data 238C), and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 241, time-frequency transformation logic (e.g., CWT logic) 242, scaling logic 243, noise isolation logic 244, and analysis logic 245 (each of which may be embodied as computer readable program code, firmware, or hardware, as an example). A local interface 246 is also included in FIG. 23 and may be implemented as a bus or other interface to facilitate communication among the components of the computing device 200.

The processor 230 may include any processing component configured to receive and execute computer readable code instructions (such as from the data storage component 236 and/or memory component 240). The input/output hardware 232 may include an electronic display device, keyboard, mouse, printer, camera, microphone, speaker, touch-screen, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the computing device 200, and may be configured to store one or more pieces of data for access by the computing device 200 and/or other components. As illustrated in FIG. 23, the data storage component 236 may include sample data 238A, which in at least one embodiment includes raw seismic data received form one or more seismic sensors. Similarly, parameter may be stored by the data storage component 236 and may include the parameters described above with respect to Equations 2-4 (e.g., a, NAMPTH and any other parameters that may be set by a user). Other data 238C to perform the functionalities described herein may also be stored in the data storage component 236.

Included in the memory component 240 may be the operating logic 241, time-frequency transformation logic 242, scaling logic 243, noise isolation logic 244, and analysis logic 245. The operating logic 241 may include an operating system and/or other software for managing components of the computing device 200. Similarly, time-frequency transformation logic 242 may reside in the memory component 240 (or some other remote computing device) and is configured to transform the raw seismic data into the time-frequency domain, and to convert the filtered noise model from the time-frequency domain to the time domain by an inverse-time-frequency transformation. As stated above, the time-frequency transformation may be performed by a continuous wavelet transformation. The scaling logic 243 is configured to scale the amplitude of the seismic data in the time-frequency domain so that it is normalized between a minimum value (e.g., zero) and a maximum value (e.g., one). The noise isolation logic 244 is configured to further scale down the estimated signal data of the scaled seismic data in the time-frequency domain to isolate the noise model. The noise isolation logic 244 may also be configured to subtract the noise model from the raw seismic data in the time domain. The analysis logic 245 is configured to perform further processing on the estimated signal data, such as perform frequency spectra analysis, create visualizations of the estimated signal data, generate drilling recommendations, and the like.

In should now be understood that the disclosed embodiments of the present disclosure are directed to systems and methods for efficiently filtering interface waves, such as Scholte/Rayleigh and guided waves, from seismic data. Unlike previous methods that require at least two seismic traces from a given seismic sensor and require multi-component processing, embodiments of the present disclosure filter interface waves using only one seismic trace from a given seismic sensor and only single-component processing. Therefore less data and computer processing energy and time is needed to filter the interface waves over previous methods. The embodiments described herein can be used on all environments, such as land, transition zones, and OBC.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of filtering seismic data, the method comprising:
receiving seismic data from one or more seismic sensors;
storing the seismic data in a non-transitory memory component;
comparing amplitude coefficients of elements of a matrix storing the seismic data in a time-frequency domain against an amplitude threshold, and comparing frequencies of the elements of the matrix against a maximum expected frequency of noise;
for each amplitude coefficient having less than the amplitude threshold and an associated frequency less than the maximum expected frequency of noise, scaling the amplitude coefficient to reduce its value;
performing an inverse time-frequency transformation on the matrix to generate a noise model in a time domain;
subtracting the noise model from the seismic data in the time domain to generate filtered seismic data, and
displaying, on an electronic display, a graphical representation of the filtered seismic data.

2. The method of claim 1, further comprising:
receiving the seismic data in the time domain; and
performing a time-frequency transformation on the seismic data to generate the matrix.

3. The method of claim 2, wherein:
the time-frequency transformation is a continuous wavelet transformation;
the matrix is defined by CWT(i, j), where frequency is associated with index i and time is associated with index j; and
coefficients of the matrix are amplitudes of the seismic data in the time-frequency domain.

4. The method of claim 1, further comprising, prior to the comparing the amplitude coefficients, scaling the amplitude coefficients of the matrix.

5. The method of claim 4, further comprising, after the scaling of the amplitude coefficients of the matrix, applying a low-pass filter.

6. The method of claim 1, wherein the scaling the amplitude coefficient comprise s exponentially scaling.

7. The method of claim 1, wherein the seismic data comprises multiple samples and the method further comprises:
after the performing of the inverse time-frequency transformation on the matrix, determining a maximum absolute amplitude of the noise model in the time domain for each sample of the multiple samples; and scaling samples from the noise model where the maximum absolute amplitude is smaller than a ratio of the maximum absolute amplitude to a noise model amplitude thresholding factor.

8. The method of claim 1, wherein the noise comprises one or more of Scholte waves and Rayleigh waves.

9. A method of filtering seismic data, the method comprising:

receiving seismic data from one or more seismic sensors;
storing the seismic data in a non-transitory memory component;
comparing amplitude coefficients of elements of a matrix storing the seismic data in a time-frequency domain against an amplitude threshold, and comparing frequencies of the elements of the matrix against a minimum expected frequency of noise;
for each amplitude coefficient having a value less than the amplitude threshold and an associated frequency greater than the minimum expected frequency of noise, scaling the amplitude coefficient to reduce a value of the amplitude coefficient;
performing an inverse time-frequency transformation on the matrix to generate a noise model in a time domain;
subtracting the noise model from the seismic data in the time domain to generate filtered seismic data, and
displaying, on an electronic display, a graphical representation of the filtered seismic data.

10. The method of claim 9, further comprising:
receiving the seismic data in the time domain; and
performing a time-frequency transformation on the seismic data to generate the matrix.

11. The method of claim 10, wherein:
the time-frequency transformation is a continuous wavelet transformation;
the matrix is defined by CWT(i, j), where frequency is associated with index i and time is associated with index j; and
coefficients of the matrix are amplitudes of the seismic data in the time-frequency domain.

12. The method of claim 9, further comprising, prior to the comparing the amplitude coefficients, scaling the amplitude coefficients of the matrix.

13. The method of claim 12, wherein the scaling of the amplitude coefficients of the matrix comprises applying a sigmoid function.

14. The method of claim 12, further comprising, after the scaling of the amplitude coefficients of the matrix, applying a low-pass filter.

15. The method of claim 9, wherein the scaling the amplitude coefficient comprise s exponentially scaling.

16. The method of claim 9, wherein the seismic data comprises multiple samples and the method further comprises:

after the performing of the inverse time-frequency transformation on the matrix, determining a maximum absolute amplitude of the noise model in the time domain for each sample of the multiple samples; and
scaling samples from the noise model where the maximum absolute amplitude is smaller than a ratio of the maximum absolute amplitude to a noise model amplitude thresholding factor.

17. The method of claim 9, wherein the noise comprises guided waves.

18. A method of filtering seismic data, the method comprising:

receiving seismic data from one or more seismic sensors;
storing the seismic data in a non-transitory memory component;
comparing amplitude coefficients of elements of a matrix storing the seismic data in a time-frequency domain against an amplitude threshold, and comparing frequencies of the elements of the matrix against a maximum expected frequency of one or more of Scholte waves and Rayleigh waves;
for each amplitude coefficient having less than the amplitude threshold and an associated frequency less than the maximum expected frequency, scaling the amplitude coefficient to reduce its value to generate a first scaled matrix;
performing an inverse time-frequency transformation on the first scaled matrix to generate a first noise model in a time domain;
comparing the frequencies of the matrix against a minimum expected frequency of guided waves;
for each amplitude coefficient having a value less than the amplitude threshold and an associated frequency greater than the minimum expected frequency, scaling the amplitude coefficient to reduce a value of the respective amplitude coefficient to generate a second scaled matrix;
performing an inverse time-frequency transformation on the second scaled matrix to generate a second noise model in the time domain;
subtracting the first noise model and the second noise model from the seismic data in the time domain to generate filtered seismic data; and
displaying, on an electronic display, a graphical representation of the filtered seismic data.

* * * * *